US012403579B2

(12) United States Patent
Olson et al.

(10) Patent No.: US 12,403,579 B2
(45) Date of Patent: Sep. 2, 2025

(54) POWER TOOL ATTACHMENT

(71) Applicant: Graco Minnesota Inc., Minneapolis, MN (US)

(72) Inventors: Diane L. Olson, Elk River, MN (US); Dennis D. Kemmetmueller, Rogers, MN (US); Nicholas A. Ness, Anoka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/661,220

(22) Filed: May 10, 2024

(65) Prior Publication Data

US 2024/0383119 A1 Nov. 21, 2024

Related U.S. Application Data

(60) Provisional application No. 63/574,378, filed on Apr. 4, 2024, provisional application No. 63/555,273, filed on Feb. 19, 2024, provisional application No. 63/601,782, filed on Nov. 22, 2023, provisional application No. 63/466,930, filed on May 16, 2023.

(51) Int. Cl.
*B25F 3/00* (2006.01)
*B05B 9/08* (2006.01)
*B25F 5/02* (2006.01)

(52) U.S. Cl.
CPC .............. *B25F 3/00* (2013.01); *B05B 9/0861* (2013.01); *B25F 5/02* (2013.01)

(58) Field of Classification Search
CPC ............. B25F 3/00; B25F 5/02; B05B 9/0861
See application file for complete search history.

(56) References Cited

U.S. PATENT DOCUMENTS

| | | | | | |
|---|---|---|---|---|---|
| 2,488,789 | A * | 11/1949 | Williams | B05B 7/2416 | 239/289 |
| 2,736,606 | A * | 2/1956 | Kmiotek | B05B 7/2416 | 239/289 |
| 3,199,193 | A * | 8/1965 | Norty | B23D 29/002 | 30/228 |
| 4,162,037 | A * | 7/1979 | Koyama | F04B 9/02 | 222/401 |
| 4,800,801 | A * | 1/1989 | van Zweeden | F04B 19/027 | 417/269 |
| 5,236,129 | A * | 8/1993 | Grime | B05B 12/0022 | 239/289 |

(Continued)

FOREIGN PATENT DOCUMENTS

| | | | |
|---|---|---|---|
| DE | 102020112668 | A1 | 11/2021 |
| WO | 2018033324 | A1 | 2/2018 |

OTHER PUBLICATIONS

Extended European Search Report for EP Application No. 24176109.7, Dated Oct. 21, 2024, pp. 10.

*Primary Examiner* — Lucas E. A. Palmer
(74) *Attorney, Agent, or Firm* — Kinney & Lange, P.A.

(57) ABSTRACT

A power tool attachment is configured to connect to a power tool at a static interface and a dynamic interface. The static interface statically fixes the power tool and power tool attachment together. The dynamic interface provides rotational motion generated by the power tool to the power tool attachment. The rotational motion is provided to a drive of the power tool attachment that converts the rotational motion to a linear reciprocating output.

16 Claims, 18 Drawing Sheets

(56) References Cited

U.S. PATENT DOCUMENTS

| | | | | | |
|---|---|---|---|---|---|
| 5,303,471 | A | | 4/1994 | Liberatoscioli | |
| 5,445,479 | A | * | 8/1995 | Hillinger | B25F 5/00 408/124 |
| 5,598,892 | A | * | 2/1997 | Fox | B25F 5/026 30/296.1 |
| 6,817,544 | B2 | * | 11/2004 | Hanson | B05B 9/0866 239/332 |
| 7,731,105 | B2 | | 6/2010 | Lishanski et al. | |
| 9,545,643 | B2 | | 1/2017 | Thompson et al. | |
| 11,618,136 | B2 | * | 4/2023 | Dash | B25B 21/002 173/46 |
| 11,986,850 | B2 | * | 5/2024 | Schroeder | B05B 13/005 |
| 2006/0112566 | A1 | * | 6/2006 | Peterson | B23D 27/04 30/194 |
| 2007/0212241 | A1 | * | 9/2007 | Lishanski | B05B 9/01 417/490 |
| 2011/0289998 | A1 | * | 12/2011 | Zhang | B23D 29/00 72/464 |
| 2012/0012677 | A1 | * | 1/2012 | Crossley, III | B05B 15/62 239/526 |
| 2013/0277455 | A1 | * | 10/2013 | Thompson | B05B 9/0866 239/289 |
| 2016/0023289 | A1 | * | 1/2016 | Moss | B25F 3/00 30/500 |
| 2016/0271781 | A1 | * | 9/2016 | Kobayashi | F16H 25/20 |
| 2022/0111500 | A1 | * | 4/2022 | Hale | B25B 23/045 |

* cited by examiner

POWER TOOL ATTACHMENT

CROSS-REFERENCE TO RELATED APPLICATION(S)

This application claims priority to U.S. Provisional Application No. 63/466,930 filed May 16, 2023 and entitled "POWER TOOL ATTACHMENT," and claims priority to U.S. Provisional Application No. 63/601,782 filed Nov. 22, 2023 and entitled "POWER TOOL ATTACHMENT," and claims priority to U.S. Provisional Application No. 63/555,273 filed Feb. 19, 2024 and entitled "POWER TOOL ATTACHMENT," and claims priority to U.S. Provisional Application No. 63/574,378 filed Apr. 4, 2024 and entitled "POWER TOOL ATTACHMENT," the disclosures of which is hereby incorporated by reference in their entireties.

BACKGROUND

This disclosure relates generally to power tool attachments. More specifically, this disclosure relates to a power tool appliance configured for airless spraying of paints and other fluids.

Power tools, such as impact drivers, drills, or other motorized tools output rotational motion. Such power tools can be capable of drilling in screws or other fasteners, particularly when hex bits are installed in the power tool for interfacing with the fastener (e.g., a flathead or Phillips head hex bits), the power tool rotating the hex bits to rotate the fasteners. Such power tools are typically battery-powered, but in some versions can include a cord for receiving power via electrical outlet. Such power tools typically include an electric motor, a handle, a trigger, and a power source. Power tool appliances can connect to the power tool to receive the rotational output from the power tool to operate the power tool appliance.

SUMMARY

According to an aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; and a mount connected to the housing, the mount configured to interface with the power tool to statically connect the power tool to the housing.

According to an additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a mount connected to the housing, the mount configured to interface with the power tool to statically connect the power tool to the housing; and a shaft aligner supported on the housing, the shaft aligner configured to bias the housing vertically upwards relative to the power tool.

According to another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a support assembly connected to the housing and extending from the housing, the support assembly configured to interface with the power tool to statically connect the power tool to the housing; and a spring disposed between the housing and the support assembly, the spring configured to bias the housing upwards and away from the support assembly to align the power tool and the power tool assembly.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a support assembly connected to the housing and extending from the housing, the support assembly configured to interface with the power tool to statically connect the power tool to the housing; and a first plurality of springs configured to bias the housing upwards and away from the support assembly to align the power tool and the power tool assembly.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a support assembly connected to the housing and extending from the housing, the support assembly configured to interface with the power tool to statically connect the power tool to the housing; a first spring configured to bias the support assembly longitudinally rearward away from the housing and vertically upwards to align the power tool and the power tool assembly; and a tensioner configured to bias a mount of the support assembly to align the power tool and the power tool assembly.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool. The power tool appliance is configured to preload the power tool.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; an arm extending from the housing, the arm configured to connect the power tool to the housing; and a strut configured to engage the arm to orient the arm relative to the housing.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; and an arm connected to the housing and configured to statically connect the power tool to the housing.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; and an arm connected to the housing and configured to statically connect the power tool to the housing, wherein the arm is reconfigurable between a contracted state and an extended state to vary a length of the arm.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; an input shaft extending out a rear end of the housing, the input shaft configured to interface with the power tool to receive the rotational input; and an arm movably connected to the housing at an arm pivot, the arm configured to statically connect the power tool to the housing.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft is unitary with the drive shaft.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft includes a keyed exterior.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft and a portion of the drive configured to exert axial force to cause axial movement of an output of the drive are formed from a single piece of metal.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft is anchored in the housing and is connectable to the power tool to receive the rotational input, wherein the rotational input shaft is not part of the power tool.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a pump at least partially disposed within the housing, the pump connected to the drive to receive the linear reciprocating output from the drive, wherein the pump including a pump inlet that is exposed through the housing, wherein the pump inlet is configured to receive spray fluid into the pump; and a spray outlet disposed downstream of the pump, the spray outlet configured to atomize the spray fluid output by the pump into a fluid spray. The power tool appliance is reconfigurable between a suction feed state in which the pump is configured to draw the spray fluid upward into the pump and a gravity feed state in which the spray fluid is configured to flow downward into the pump.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a pump at least partially disposed within the housing, the pump connected to the drive to receive the linear reciprocating output from the drive, wherein the pump including a pump inlet that is exposed through the housing, wherein the pump inlet is configured to receive spray fluid into the pump; a spray outlet disposed downstream of the pump, the spray outlet configured to atomize the spray fluid output by the pump into a fluid spray; and an arm connected to the housing and movable relative to the housing, the arm configured to statically connect the power tool to the housing. The housing is configured to pivot relative to the arm between a suction feed state, in which the pump inlet is oriented downward such that the pump is configured to draw the spray fluid upward into the pump, and a gravity feed state, in which the pump inlet is oriented upward such that the spray fluid is configured to flow downward into the pump.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a pump at least partially disposed within the housing, the pump connected to the drive to receive the linear reciprocating output from the drive, wherein the pump including a pump inlet that is exposed through the housing, wherein the pump inlet is configured to receive spray fluid into the pump; and a spray outlet disposed downstream of the pump, the spray outlet configured to atomize the spray fluid output by the pump into a fluid spray. The housing is configured to flip between a suction feed state, in which the pump inlet is oriented downward such that the pump is configured to draw the spray fluid upward into the pump, and a gravity feed state, in which the pump inlet is oriented upward such that the spray fluid is configured to flow downward into the pump.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a pump at least partially disposed within the housing, the pump connected to the drive to receive the linear reciprocating output from the drive, wherein the pump including a pump inlet that is exposed through the housing, wherein the pump inlet is configured to receive spray fluid into the pump; a spray outlet disposed downstream of the pump, the spray outlet configured to atomize the spray fluid output by the pump into a fluid spray an arm connected to the housing and movable relative to the housing; and a mount connected to the arm and movable relative to the arm. The mount and the arm are configured to statically connect the power tool to the housing. The housing is configured to pivot relative to the arm between a suction feed state, in which the pump inlet is oriented downward such that the pump is configured to draw the spray fluid upward into the pump, and a gravity feed state, in which the pump inlet is oriented upward such that the spray fluid is configured to flow downward into the pump.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a mount connected to the housing, the mount configured to interface with the power tool to statically connect the power tool to the housing; and a fixation configured to wrap around the mount and a base of the power tool to fix the power tool to the mount.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a drive at least partially disposed within the housing, the drive configured to dynamically connect to the power tool to receive the rotational input from the power tool; a mount connected to the housing, the mount configured to interface with the power tool to statically connect the power tool to the housing; and a fixation configured to extend through a slot that extends laterally through the mount to wrap around the mount and a base of the power tool to fix the power tool to the mount.

According to yet another additional or alternative aspect of the present disclosure, a power tool appliance is configured for use with a power tool that outputs rotational motion, the power tool appliance configured to attach to and receive rotational input from the power tool. The power tool appliance includes a housing; a turbine at least partially disposed within the housing; a drive at least partially disposed within the housing, the drive configured to dynamically connect to the power tool to receive the rotational input from the power tool and configured to provide rotational motion to the turbine to drive the turbine; a duct disposed downstream of the turbine, the duct narrowing from the turbine and configured to direct airflow to a spray orifice; and a mount connected to the housing, the mount configured to interface with the power tool to statically connect the power tool to the housing.

According to yet another additional or alternative aspect of the present disclosure, a method includes inserting an input shaft extending out from a housing of a power tool appliance into a bit receiver of a power tool; mounting the power tool to a mount of the power tool appliance to statically connect the power tool relative to the housing; and pulling the trigger of the power tool to cause an output of the power tool appliance.

According to yet another additional or alternative aspect of the present disclosure, a power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; a pump at least partially disposed within the housing, the pump connected to the drive to receive a linear reciprocating output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; a support assembly connected to the housing and extending from the housing, the support assembly configured to interface with the power tool to statically connect the power tool to the housing; and a biaser configured to bias the support assembly to align the power tool and the drive.

According to yet another additional or alternative aspect of the present disclosure, a power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; a pump at least partially disposed within the housing, the pump connected to the drive to receive a linear reciprocating output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; a support assembly including an arm connected to the housing and extending from the housing, the support assembly configured to interface with the power tool to statically connect the power tool to the housing; and a spring disposed between the arm and the housing, the spring configured to bias the housing upward and away from the support assembly to align the power tool and the drive.

According to yet another additional or alternative aspect of the present disclosure, a power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; a pump at least partially disposed within the housing, the pump connected to the drive to receive a linear reciprocating output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; a support assembly including an arm connected to the housing and extending from the housing, the support assembly configured to interface with the power tool to statically connect the power tool to the housing; and a spring disposed within the arm, the spring configured to adjust a length of the arm and configured to bias the arm towards a contracted state to align the power tool and the drive.

According to yet another additional or alternative aspect of the present disclosure, a power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool, the drive configured to rotate on a drive axis; a pump at least partially disposed within the housing, the pump connected to the drive to receive a linear reciprocating output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; and a support assembly connected to the housing and extending from the housing, the support assembly configured to interface with the power tool to statically connect the power tool to the housing; wherein a piston of the pump is vertically aligned with the drive and radially offset from the drive axis.

According to yet another additional or alternative aspect of the present disclosure, a power tool appliance for use with a power tool that outputs rotational motion for one or both of drilling and fastening, the power tool appliance configured to attached to, and receive rotational input from, the power tool, the power tool appliance including a housing; a drive at least partially located within the housing, the drive comprising an input shaft having an end that is configured to be received by the power tool, the input shaft extending into the housing, the drive converting rotational motion received from the power tool through the input shaft into a reciprocating motion; and a support connected to the housing, the support configured to interface with the power tool to statically connect the power tool to the housing, the support comprising an arm that extends away from the housing and that connects between the power tool and the housing.

According to yet another additional or alternative aspect of the present disclosure, a method of using a power tool appliance to convert rotational motion output from a power tool to reciprocating motion, the method including mounting the power tool to the power tool appliance, the power tool appliance comprising: a housing; a drive at least partially located within the housing, the drive comprising an input shat, the input shaft extending out from the housing; and a support connected to the housing, the support configured to interface with the power tool to statically connect the power tool to the housing, the support comprising an arm that extends away from the housing and which connects between the power tool and the housing, wherein mounting comprises the input shaft being received within the power tool; and operating the power tool appliance via the power tool by the drive converting rotational motion received from the power tool through the input shaft into a reciprocating motion.

DETAILED DESCRIPTION

Figure 1:
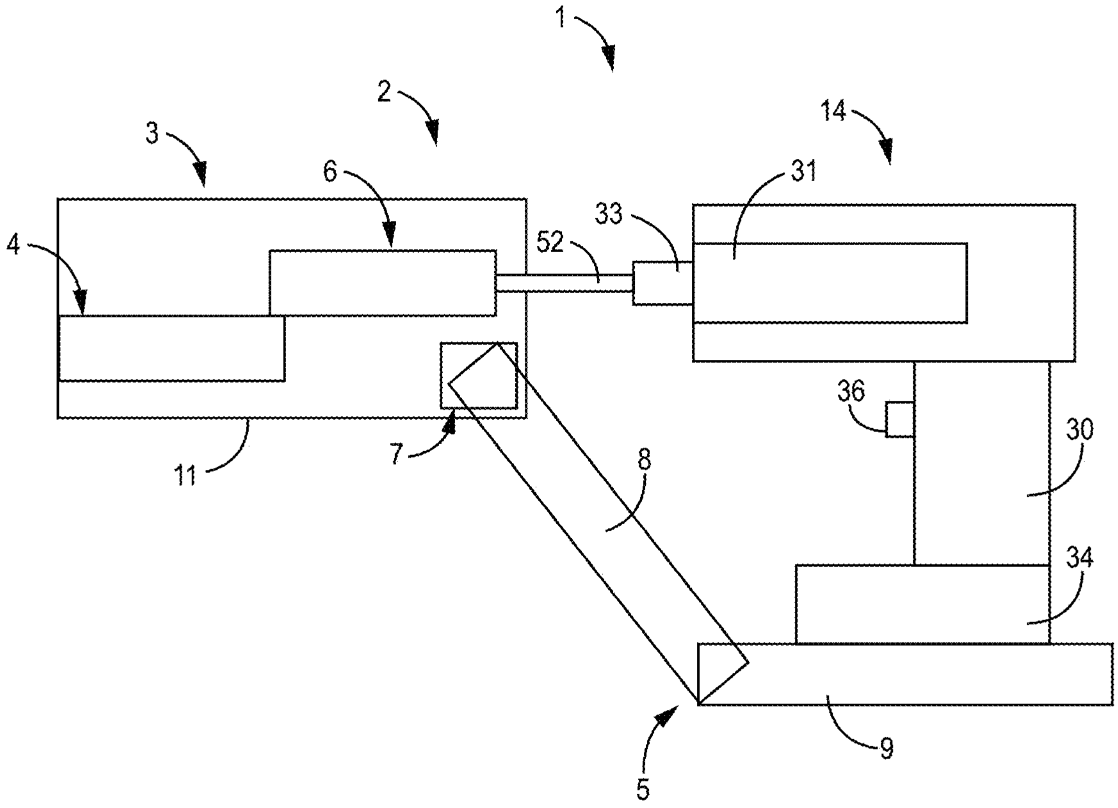
FIG. 1 is a block diagram of a tool system.

Power tool appliances according to the present disclosure can be connected to a variety of power tools. Such power tools can be impact drivers, drills, or other motorized tools which output rotational motion. Such power tools can be capable of drilling in screws or other fasteners, particularly when hex bits are installed in the power tool for interfacing with the fastener (e.g., a flathead or Phillips head hex bits, among others), the power tool rotating the hex bits to rotate the fasteners. Such power tools are typically battery-powered, but in some versions can include a cord for receiving power via an electrical outlet. Such power tools typically include an electric motor, a handle, a trigger, and a power source. The term "power tool" can refer to all types of power tool options.

The power tool appliance interfaces with the power tool to receive rotational output from the power tool so that the power tool appliance can perform an operation. For example, the power tool appliance may receive rotational motion from the power tool and convert the rotational motion into linear reciprocating motion, such as for operating a pump or a saw, amongst other options. In various examples, the power tool appliance receives the rotational motion input from the power tool and does not convert the rotational motion into linear reciprocating motion, but instead the operation within the power tool uses the rotational motion. For example, the rotational motion may be used to turn a turbine to generate airflow, such as for high volume, low pressure (HVLP) spraying of paints, stains, finishes, and/or other coatings.

The main example of a power tool appliance disclosed herein is that of a sprayer, such as for spraying paints, stains, finishes, and/or other coatings. It is understood, however, that the teachings of the present disclosure apply to other types of power tool appliances which are not sprayers. As such, while a sprayer is used as the main example, the features can be embodied in other power tool appliances that perform functions other than spraying.

A power tool appliance according to aspects of the disclosure can be configured to connect to a power tool to receive a dynamic driving input from the power tool. The power tool is statically connected to the power tool appliance to form a single tool system. The power tool appliance can include a load compensator that is configured to provide force compensation to prevent side-loading on the drive shaft of the power tool. The load compensator can include one or more springs that bias the power tool relative to a housing of the power tool appliance.

The power tool appliance can include a strut that is configured to pivot to align an arm that connects the power tool with the housing of the power tool appliance. The strut can be formed as a plate among other options. The strut is configured to position the arm to provide force compensation and prevent loading on the drive shaft of the power tool.

The arm can connect a mount that connects to the power tool to the housing of the power tool appliance. The arm can be extendable. The arm can be extendable between various lengths such that the power tool appliance can accommodate and operate with power tools of various different sizes and configuration. According to some examples of the disclosure, the arm can be tensioned such that the arm is biased towards a contracted, shortened state.

A drive of the power tool appliance is configured to receive the rotational output from the power tool. An input shaft can extend out of the housing of the power tool appliance to interface with the power tool and receive the rotational output. The input shaft can include a hexagonal exterior contour. The input shaft can, in some examples, be monolithically formed with other components of the drive.

Power tool appliances according to some aspects of the disclosure can be configured for operation in gravity and/or suction feed states. Some examples of power tool appliances can include multiple pump inlets, with a suction inlet configured for suction feed operations and a gravity inlet configured for gravity feed operations. Power tool appliances according to some aspects of the disclosure can be inverted between suction feed and gravity feed states. In the suction feed state, a pump inlet of the pump is oriented vertically downward and the pump is configured to draw spray fluid up from a reservoir against the force of gravity. In the gravity feed state, the pump inlet of the pump is oriented vertically upward such that the fluid flows with gravity to feed the pump.

The power tool is statically connected to the power tool appliance. In some examples, a fixation can secure the power tool to the power tool appliance. The fixation can be formed as a strap that attaches a base of the power tool to the power tool appliance to form the static interface.

Power tool appliances according to the disclosure can, in some examples, be configured to increase a rotational speed of the rotational input received from the power tool. The power tool appliance can be configured such that the rotational motion is used to turn a turbine to generate airflow, such as for high volume, low pressure spraying of paints, stains, finishes, and/or other coatings. The power tool appliance can include overdrive gearing that outputs rotation at a higher speed than received to drive the turbine and generate desired airflow.

Components can be considered to radially overlap when those components are disposed at common axial locations along an axis. A radial line extending orthogonally from axis will extend through each of the radially overlapping components. Components can be considered to axially overlap when those components are disposed at common radial and circumferential locations relative to the axis. An axial line parallel to the axis will extend through the axially overlapping components. Components can be considered to circumferentially overlap when those components are disposed at common radial distance and axial locations along the axis, such that a circle centered on the axis passes through each of the circumferentially overlapping components.

FIG. 1 is a block diagram of tool system 1. Tool system 1 includes power tool appliance 2 and power tool 14. Output assembly 3, appliance output 4, support assembly 5, drive 6, and biaser 7 of power tool appliance 2 are shown. Support assembly 5 includes arm 8 and mount 9. Power tool 14 includes tool handle 30, tool motor 31, tool output 33, power system 34, and trigger 36.

Power tool appliance 2 is configured to connect to power tool 14 to be operated by power tool 14. Power tool 14 is configured to provide operating power to power tool appliance 2. Power tool 14 can be any type of power tool, particularly a type that outputs rotational motion. A common type of such power tool 14 is an impact driver suitable for driving screws into wood and similar materials. The power tool can also be a drill commonly used with bits to drill into material such as wood, as well as drive screws into such materials. The power tool 14 includes a tool handle 30. The entirety of the tool system 1 can be supported by single hand grabbing handle 30 to support the entirety of the tool system 1 and to operate the tool system 1, while a finger of the hand actuates the trigger 36 of the power tool 14.

As shown, the power tool 14 includes a trigger 36 which upon actuation causes power system 34, such as a battery though it is understood that power tool 14 can include a power cord, of the power tool 14 to operate tool motor 31 within the power tool 14 to output rotational motion from the tool output 33 of the power tool 14. The tool output 33 can be formed as a clamp, such as a bit holder, such as a chuck, collet, sleeve, and/or driverback bit holder. The tool output 33 is configured to provide the rotational output from the power tool 14 to the power tool appliance 2. The tool output 33 can be configured as a hex bit socket. Such a hex bit socket can receive and retain a hex bit, such as by radial clamping and/or detent (e.g., ball) in a groove of the hex bit. The power tool appliance 2 does not include a trigger, only the power tool 14 has a trigger which when pulled causes the power tool appliance 2 to operate (e.g., spray). In the example shown, the power tool appliance 2 does not include any electrical components that facilitate output by the power tool appliance 2.

Output assembly 3 is configured to receive rotational output from the power tool 14 and is configured to provide the output of the tool system 1. The output assembly 3 includes appliance output 4 that is configured to provide the working output from output assembly 3. The appliance output 4 can, in some examples, be a mechanical output that provides work. For example, the appliance output 4 can be configured as a saw, spray output, other fluid output (e.g., gas for blowing or liquid such as for liquid transfer), piston, or other tool element.

The power tool 14 is dynamically, mechanically connected to the output assembly 3 to provide the rotational input to the output assembly 3. The support assembly 5 statically connects the power tool 14 to the output assembly 3. The support assembly 5 and output assembly 3 are connected together. The support assembly 5 and output assembly 3 can be movable relative to each other.

The support assembly 5 can be repositioned relative to the output assembly 3. In some examples, the support assembly 5 is movable relative to the output assembly 3 to adjust an angle between the arm 8 and the housing 11. In some example, the support assembly 5 is movable relative to the output assembly 3 by adjusting a length of the arm 8. The support assembly 5 being movable relative to the output assembly 3 facilitates positioning of power tool 14 relative to power tool appliance 2 and formation of static and dynamic interfaces between the power tool 14 and power tool appliance 2.

Housing 11 can enclose and/or support various other components of power tool appliance 2. Housing 11 can be a polymer housing, among other options. The housing 11 can be a clamshell having two lateral sides, among other options.

Drive 6 is at least partially disposed within housing 11. Drive 6 is configured to receive the rotational input from power tool 14 and provide an output to appliance output 4. The drive 6 is configured to mechanically power appliance output 4. For example, the drive 6 can be connected to a pump to power pumping by the pump. In examples in which the appliance output 4 is a spray output, the pump can be configured to pump spray fluid to a nozzle through which the spray fluid is output at a spray. For example, the nozzle can be configured to atomize the spray fluid into the fluid spray.

Drive 6 receives the rotational output from power tool 14. The mechanical output from drive 6 operates the appliance output 4. In some examples, the drive 6 can be configured to provide a linear output that operates the appliance output 4. For example, the drive 6 can be configured to provide a linear reciprocating output (e.g., to a piston or a saw blade) to cause operation of power tool appliance 2. In some examples, the drive 6 can be configured to provide a rotational output that operates the appliance output 4. For example, the drive can be configured to drive rotation of a turbine, gear set, chain, belt, or other device to operate the appliance output 4.

A rotational input shaft 52 extends from outside of the housing 11 into the housing 11. Input shaft 52 is configured to interface with the power tool 14 to receive the rotational output from the power tool 14. In the example shown, the input shaft 52 interfaces with tool output 33, such as by being received within the tool output 33, to receive the rotational output from the power tool 14. The input shaft 52 is connected to the drive 6 to provide the rotational motion to the drive 6. In some examples, the input shaft 52 can be formed monolithically with other rotating portions of the drive 6. The input shaft 52 can be considered to form a portion of the drive 6. The drive 6 converts the rotational motion to another type of motion, such as a rotational output or reciprocating motion.

Input shaft 52 extends out from a rear side of the housing 11. Input shaft 52 an be multifaceted. The multifaceted exterior of the input shaft 52 facilitates formation of a driving, dynamic interface between power tool appliance 12 and power tool 14. The input shaft 52 can be a hex shaft, having the same hexagonal shape as a hex bit, that is received within the tool output 33 of the power tool 14 (e.g., within the hex bit socket).

It is noted that in the example shown the rotational input shaft 52 is part of the power tool appliance 2 and is not part of the power tool 14. As such, upon disconnection of the power tool appliance 2 from the power tool 14, the rotational input shaft 52 remains with the power tool appliance 2 and not the power tool 14, as the input shaft 52 is withdrawn from the clamp 32. However, in various other examples, the rotational input shaft 52 is not part of the power tool appliance 2.

Support assembly 5 includes arm 8 that is connected to housing 11. Arm 8 extends from housing 11. The arm 8 is movable relative to the housing 11. The arm 8 can be repositioned to change a location of the mount 9 relative to the housing 11. In some examples, the arm 8 is repositionable to change an angle between the arm 8 and the housing 11. In some examples, the arm 8 is repositionable to change a length of the arm 8. Mount 9 is connected to arm 8. Mount 9 is connected to an opposite end of arm 8 from the housing 11. Mount 9 is configured to interface with the power tool 14. The mount 9 can be a plate, amongst other options. The mount 9 can include a first side for interfacing with the base of the power tool 14 (e.g., a battery of the power tool 14 or other portion of a base of the power tool 14) and a second side opposite of the first side that is facing downward away from the power tool 14 and can support tool system 1 on a surface when set down. In some examples, mount 9 is movable relative to arm 8. Mount 9 can be moved relative to arm 8 to reorient mount 9 relative to arm 8.

It is noted that not all examples of power tool appliance 2 includes mount 9 in the manner of the power tool 14 resting on top of the mount 9. In various other examples, the power tool 14 can be held by the mount 9 without the mount 9 forming a tray. For example, the mount 9 may clamp onto the sides of the base of the power tool 14, or may clamp onto the tool handle 30 of the power tool 14, among other options.

The power tool appliance 2 includes one or more biasers 7 that are configured to urge the housing 11 relative to the power tool 14. In some examples, the biaser 7 is configured to align support assembly 5 and housing 11 relative to each other. The biaser 7 can be configured to set an angle of the support assembly 5 relative to the housing 11. For example, the biaser 7 can be configured to set an angle θ of the arm 8 relative to vertical. The biaser can be configured to set a length of the support assembly 5. For example, the biaser can be configured to set a length of arm 8. Such a biaser 7 can be configured to urge the arm 8 towards a shorter, contracted state. The one or more biasers 7 can be formed as one or more springs, among other options.

In some examples, the one or more biasers 7 of the power tool appliance 2 are configured to preload the dynamic interface between the power tool appliance 2 and the power tool 14 (e.g., the interface between input shaft 52 and tool output 33). The biaser can preload the dynamic interface by biasing the housing 11 vertically upward. Such a configuration can counteract the weight of output assembly 3 and can align the input shaft 52 with tool output 33. In some additional or alternative examples, the biaser 7 can preload the dynamic interface by biasing the arm 8 towards a contracted state. For example, the biaser 7 can pull the mount 9 to bias the power tool 14 vertically upward while the dynamic interface is fixed between the input shaft 52 and the power tool 14. The biaser 7 can preload the dynamic interface by biasing the housing 11 upward and into alignment with the power tool 14. The biaser 7 can preload the dynamic interface by biasing the support assembly 5 and housing 11 away from each other. For example, the biaser 7 can urge the housing 11 vertically upward and longitudinally away from the support assembly 5 while the dynamic interface is fixed between the input shaft 52 and the power tool 14. Preloading the dynamic interface provides for a secure connection between power tool 14 and power tool appliance 2 that provides for efficient and easy operation. Such preloading can further inhibit the power tool 14 from entering an impact mode. Power tool appliance 2 provides significant advantages. Biaser 7 is configured to urge the output assembly 3 relative to the power tool 14, providing for a tight fit and alignment therebetween. The biaser 7 can include one or more springs. Forming the one or more biasers 7 from one or more springs facilitates automatic and quick fitting and alignment. The springs can retract the arm 8 to a desired length that fits the power tool 14 without requiring additional input from the user, such as adjusting knobs or clamps. The springs can bias the output assembly 3 relative to the support assembly 5 to align the power tool 14 and output assembly 3. Such a configuration can automatically compensate and maintain alignment even during changes in orientation or weight of the power tool appliance 2. For example, the weight of power tool appliance 2 can change in examples in which power tool appliance 2 is configured as a sprayer and as spray fluid is emitted. The orientation of the center of gravity of output assembly 3 can change as the appliance output 4 is oriented upward or downward.

Figure 2A:
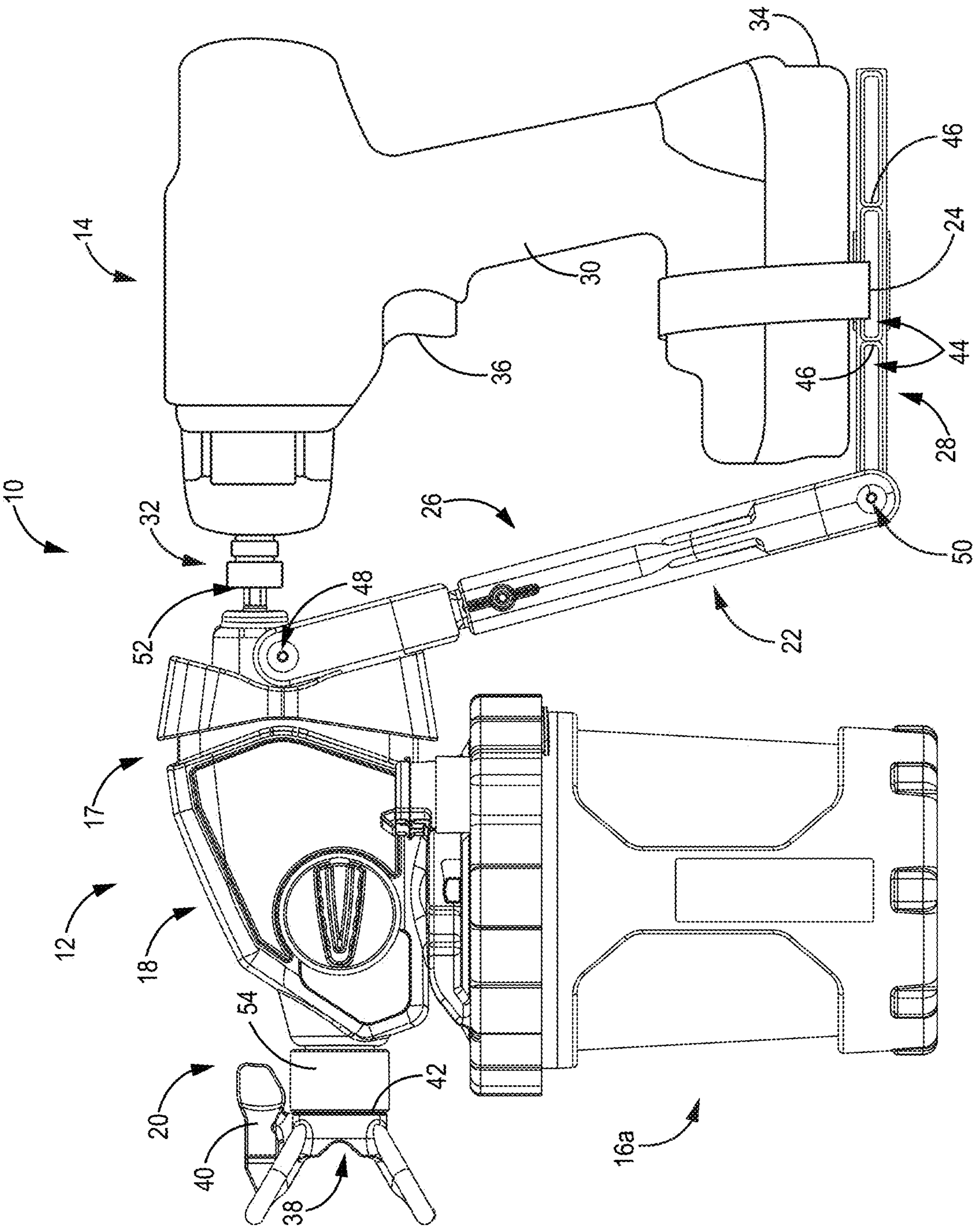
FIG. 2A is a first side elevational view of a tool system.
Figure 2B:
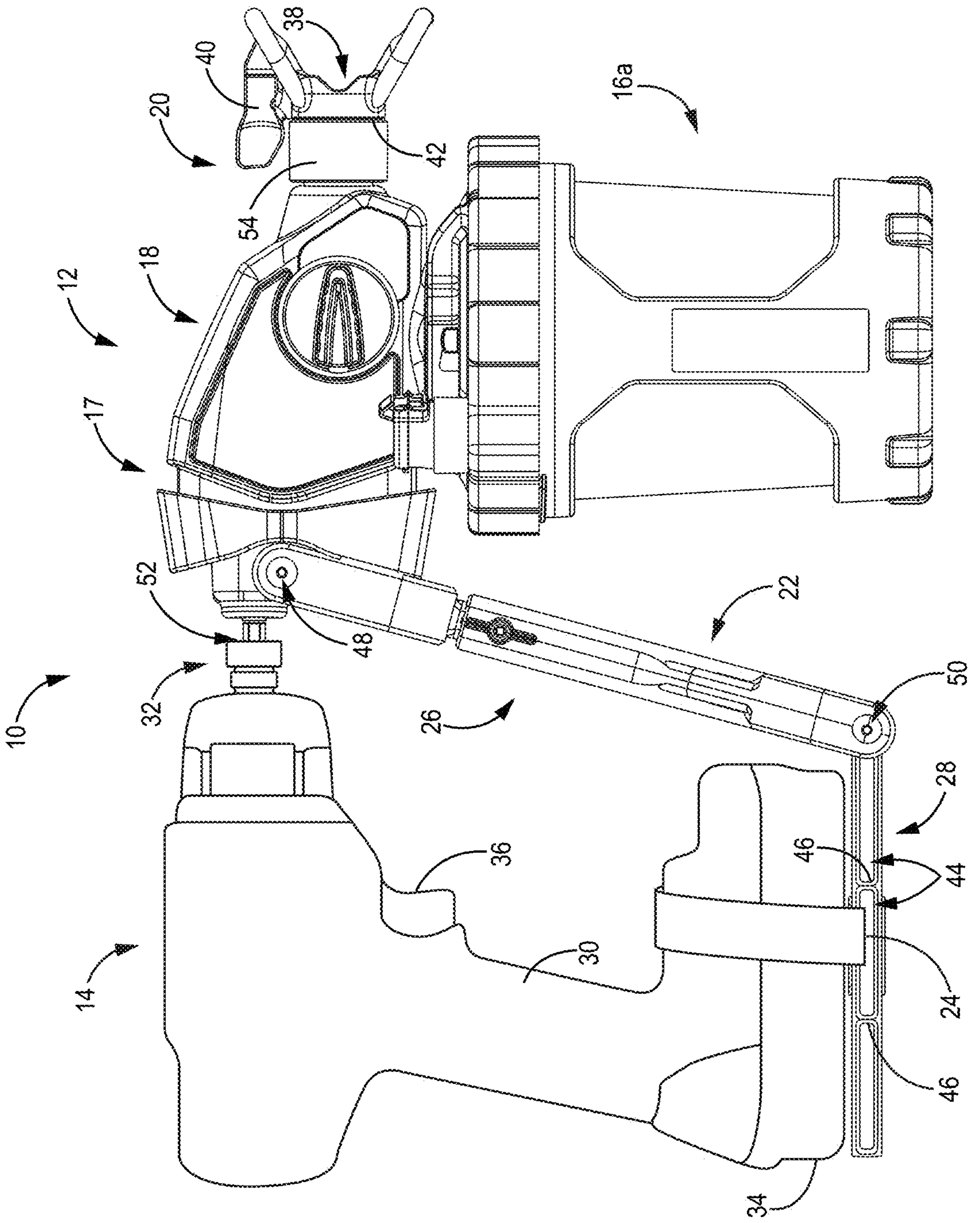
FIG. 2B is a second side elevational view of the tool system.

FIG. 2A is a first side elevational view of tool system 10. FIG. 2B is a second side elevational view of tool system 10. FIGS. 2A and 2B are discussed together. Tool system 10 is substantially similar to tool system 1 (FIG. 1). It is noted that, while tool system 10 is shown as a sprayer, any other type of power tool appliance can be substituted for the sprayer, including use of the features shown on the sprayer, such as for reciprocating a tool element such as a saw.

Tool system 10 includes power tool appliance 12, power tool 14, and reservoir 16*a*. Output assembly 17, tip assembly 20, support assembly 22, and fixation 24 of power tool appliance 12 are shown. Housing 18 of output assembly 17 is shown. Support assembly 22 includes arm 26 and mount 28. Power tool 14 includes tool handle 30, clamp 32, power system 34, and trigger 36. Power tool appliance 12 can be similar to or the same as power tool appliance 2. Output assembly 17 can be similar to or the same as output assembly 3. Support assembly 22 can be similar to or the same as support assembly 5.

Power tool appliance 12 is configured to connect to power tool 14 to be operated by power tool 14. Power tool 14 is configured to provide operating power to power tool appliance 12. Power tool 14 can be any type of power tool, particularly a type that outputs rotational motion. A common type of such power tool 14 is an impact driver suitable for driving screws into wood and similar materials. The power tool can also be a drill commonly used with bits to drill into material such as wood, as well as drive screws into such materials. The power tool 14 includes a tool handle 30. The entirety of the tool system 10 can be supported by single hand grabbing handle 30 to support the entirety of the tool system 10 and to operate the tool system 10, while a finger of the hand actuates the trigger 36 of the power tool 14.

As shown, the power tool 14 includes a trigger 36 which upon actuation causes power system 34, such as a battery though it is understood that power tool 14 can include a power cord, of the power tool 14 to operate an electric motor within the power tool 14 to output rotational motion from the clamp 32 of the power tool 14. The clamp 32 of the power tool 14 can be any bit holder option, such as a chuck, collet, sleeve, and/or driverback bit holder. The clamp 32 can be a hex bit socket. Such a hex bit socket can receive and retain a hex bit, such as by radial clamping and/or detent (e.g., ball) in a groove of the hex bit. The power tool appliance 12 does not include a trigger, only the power tool 14 has a trigger which when pulled causes the power tool appliance 12 to operate (e.g., spray).

The power system 34 can be a battery as shown. The power system 34 can be located at a base of the power tool 14 such that the power tool 14 ordinarily rests upon the power system 34. In particular, the power system 34 can be a detachable, rechargeable battery pack that is mounted to the bottom of the gun handle 30.

Output assembly 17 is configured to receive rotational output from the power tool 14 and is configured to provide the output of the tool system 10. In the example shown, the output assembly 17 is configured for fluid spraying, through it is understood that not all examples are so limited. The power tool 14 is dynamically, mechanically connected to the output assembly 17 to provide the rotational input to the output assembly 17. The support assembly 22, which can also be referred to as a support, statically connects the power tool 14 to the output assembly 17. The support assembly 22 and output assembly 17 are connected together. In the example shown the support assembly 22 and output assembly 17 are pivotably connected to each other.

Housing 18 can enclose and/or support various other components of power tool appliance 12. Housing 18 can be similar to or the same as housing 11. Housing 18 can be a polymer housing, among other options. The housing 18 can be a clamshell having two lateral sides, among other options. As shown, a rotational input shaft 52 extends from outside of the housing 18 into the housing 18. As discussed in more detail below, the housing 18 contains a mechanism which converts the rotational motion to another type of motion, such as reciprocating motion for operating a piston, saw, or other tool element.

Input shaft 52 extends out from a rear side of the housing 18. The input shaft 52 can be a hex shaft, having the same hexagonal shape as a hex bit, that is received within the clamp 32 of the power tool 14 (e.g., within the hex bit socket). Such hexagonal shape includes six flat sides that come together at six corners. The corners can have 120-degree interior angles. The input shaft 52 can include a circumferential groove that allows for interfacing with a detent of the clamp 32 of the power tool 14. The input shaft 52 can be retained in the clamp 32 in the same manner as a hex bit is retained by the clamp 32 when the hex bit is used for driving fasteners such as screws. For example, the clamp 32 can clamp onto the input shaft 52.

It is noted that in the example shown the rotational input shaft 52 is part of the power tool appliance 12 and is not part of the power tool 14. As such, upon disconnection of the power tool appliance 12 from the power tool 14, the rotational input shaft 52 remains with the power tool appliance 12 and not the power tool 14, as the input shaft 52 is withdrawn from the clamp 32. However, in various other examples, the rotational input shaft 52 is not part of the power tool appliance 12.

Being that the particular example of the power tool appliance 12 shown is part of a sprayer, the power tool appliance 12 includes a spray outlet 38. The spray outlet 38 can be a nozzle. In the example shown, spray outlet 38 is formed as a portion of spray tip assembly 20. Spray tip assembly 20 is connected to housing 18 and supported by housing 18. The spray outlet 38 is configured to atomize the fluid output by a pump of the power tool appliance 12 into a fluid spray. The spray outlet 38 can be a rotatable spray tip which can reverse its flow for unclogging. Specifically, the spray outlet 38 can be part of a rotatable spray tip 40 that includes a barrel that is received in a cylindrical cavity of a tip housing 42 of the tip assembly 20, the barrel rotatable within the cylindrical cavity by 180-degrees to reverse the direction of flow through the barrel, to push any clogs out of the spray tip 40.

Reservoir 16*a* is supported by housing 18 such that reservoir 16*a* can be carried with housing 18. The reservoir 16*a* is configured to contain a supply of the spray fluid, such as paint. The spray fluid inside of the fluid reservoir 16*a* can be drawn up into the housing 18. As further explained herein, the fluid reservoir 16*a* can be located above the housing 18 such that gravity feeds the spray fluid from the fluid reservoir 16*a* into the housing 18 or can be located below the housing such that the fluid is sucked from the fluid reservoir 16*a* into the housing 18. The fluid reservoir 16*a* can include a squeezable liner inside of a windowed housing, the squeezable liner flexible such that the liner collapses as fluid is withdrawn from the fluid reservoir 16*a*. Alternatively, the fluid reservoir 16*a* may be rigid cup or pot without a liner that collapses.

Support assembly 22 is configured to support the power tool 14 relative to the housing 18. The support assembly 22 can thereby support the power tool 14 relative to the input shaft 52. The support assembly 22 can support the power tool 14 relative to a pump, a drive, and other internals of the housing 18.

Support assembly 22 includes arm 26 that is connected to housing 18. Arm 26 can be similar to or the same as arm 8. Arm 26 extends from housing 18. Arm 26 is connected to housing 18 at a rear end of housing 18. The arm 26 connects to the housing 18 at an opposite longitudinal end of housing 18 from spray outlet 38.

Mount 28 is connected to arm 26. Mount 28 can be similar to or the same as mount 9. Mount 28 is connected to an opposite end of arm 26 from the housing 18. The arm 26 can be considered to connect to housing 18 at an inner end of arm 26 and can be considered to connect to mount 28 at an outer end of arm 26. Mount 28 is configured to interface with the power tool 14. The mount 28 can be a plate, amongst other options. The mount 28 can include a first side for interfacing with the base of the power tool 14 (e.g., a battery of the power tool 14 or other portion of a base of the power tool 14) and a second side opposite of the first side for interfacing with the base of the power tool 14 when the power tool appliance 12 is flipped, as further discussed herein, or that is otherwise facing downward away from the power tool 14. It is noted that in various examples the mount 28 is intended to only have its first side interface with the base of the power tool 14 such that the second side of the mount 28 is not intended to interface with the base of the power tool 14, and housing 18 does not flip in the manner discussed herein.

Fixation 24 is configured to secure the power tool 14 to the power tool appliance 12. The fixation 24 statically connects the power tool 14 to the power tool appliance 12. In the example shown, the fixation 24 is formed as a strap, though it is understood that other configurations are possible. Thee strap can include hook-and-loop fasteners. In some examples, the strap can be a double-sided hook-and-loop strap that attaches to itself. For example, both sides of the fixation 24 can include interspersed hooks and loops such that either side can connect to itself or to the other side of fixation 24. The fixation 24 can attach the power tool 14 to the mount 28. The fixation 24 can be another type of strap that does not include hook-and-loop connection in various other examples.

In some examples, the fixation 24 is configured to wrap around a portion of the power tool 14 to retain the power tool on the mount 28. In the example shown, fixation 24 is configured to wrap around the power system 34 of the power tool 14 to retain the power tool 14 on the mount 28. The fixation 24 wraps around and engages the top and lateral sides of the power system 34 of the power tool 14 to retain the power tool 14 on the mount 28. The fixation 24 does not engage the bottom side of the power tool 14 in the example shown, though it is understood that other mounting options are possible. For example, fixation 24 could be a clamp instead of a strap, the clamp clamping onto the power system 34. In other examples the fixation 24 can interface with the handle 30 or body of the power tool 14.

In the example shown, fixation 24 secures the power tool 14 to mount 28. Mount 28 includes slot 44 that extends through mount 28. Slot 44 is open laterally through mount 28. The slot 44 extends laterally through the mount 28 with openings on opposite lateral sides of the mount 28 through which the fixation 24 can extend. Slot 44 is configured such that fixation 24 can pass fully through mount 28 within slot 44. In the example shown, a plurality of slots 44 are formed through mount 28. The multiple slots 44 facilitate passing fixation 24 around mount 28 at different locations longitudinally along mount 28. Alternatively, the fixation 24 can wrap all the way around the mount 28, such that the fixation 24 contacts the second (downward-facing) side of the mount 28. However, slots 44 accommodating the fixation 24 allows the tool system 10 to be set down on a surface with the second surface of the mount 28 facing down to engage the surface on which the tool system 10 rests while not resting upon the fixation 24, providing for better balance and preventing tipping or rocking.

In the example shown, the slot 44 is disposed between ribs 46 of the mount 28. The ribs 46 are disposed on the longitudinal ends of the slot 44 to longitudinally define the slot 44. The ribs 46 overlap with the fixation 24 to prevent the fixation 24 from sliding longitudinally off of mount 28. The ribs 46 can also provide additional rigidity to mount 28, reducing the weight of mount 28, providing for a lighter and easier to handle power tool appliance 12.

It is noted that not all examples of power tool appliance 12 includes mount 28 in the manner of the power tool 14 resting on top of the mount 28. In various other examples, the power tool 14 can be held by the mount 28 without the mount 28 forming a tray. For example, the mount 28 may clamp onto the sides of the base of the power tool 14, or may clamp onto the tool handle 30 of the power tool 14, among other options.

In the example shown, arm 26 is movable relative to housing 18. Arm 26 can be moved relative to housing 18 to reorient arm 26 relative to housing 18. In the example shown, arm 26 is pivotably connected to housing 18. Arm 26 is connected to housing 18 by arm pivot 48. Arm pivot 48 can also be referred to as an upper pivot or an inner pivot. Pivoting can be facilitated by pins, axles, and/or bearings which allow relative rotation. While arm pivot 48 is connected to housing 18, it is understood that in various examples the arm pivot 48 indirectly connects the arm 26 to the housing 18. In the example shown, the arm pivot 48 directly connects the arm 26 to the housing 18. Arm pivot 48 allows the arm 26 to move by rotation relative to the housing 18.

In the example shown, mount 28 is movable relative to arm 26. Mount 28 can be moved relative to arm 26 to reorient mount 28 relative to arm 26. In the example shown, mount 28 is pivotably connected to arm 26. The mount 28 can rotate relative to arm 26 to move relative to arm 26. Mount 28 is connected to arm 26 by mount pivot 50. Mount pivot 50 can also be referred to as a lower pivot or an outer pivot. Pivoting can be facilitated by pins, axles, and/or bearings which allow relative rotation. While mount 28 and arm 26 are rotatably supported in the example shown, it is understood that some examples do not include the arm pivot 48 and/or the mount pivot 50.

In some examples, the arm pivot 48 can be configured as a free pivot in which arm 26 can freely swing from housing 18 when a power tool 14 is not connected. In other examples, the arm pivot 48 can include resistance that maintains the arm 26 in a desired orientation until overcome by a reorienting force, such as the user grasping and reorienting arm 26. Similar to arm pivot 48, the mount pivot 50 can be configured as a free pivot in which mount 28 can freely swing from arm 26 when a power tool 14 is not connected. In other examples, the mount pivot 50 can include resistance that maintains the mount 28 in a desired orientation until overcome by a reorienting force, such as the user grasping and reorienting mount 28.

Figure 3:
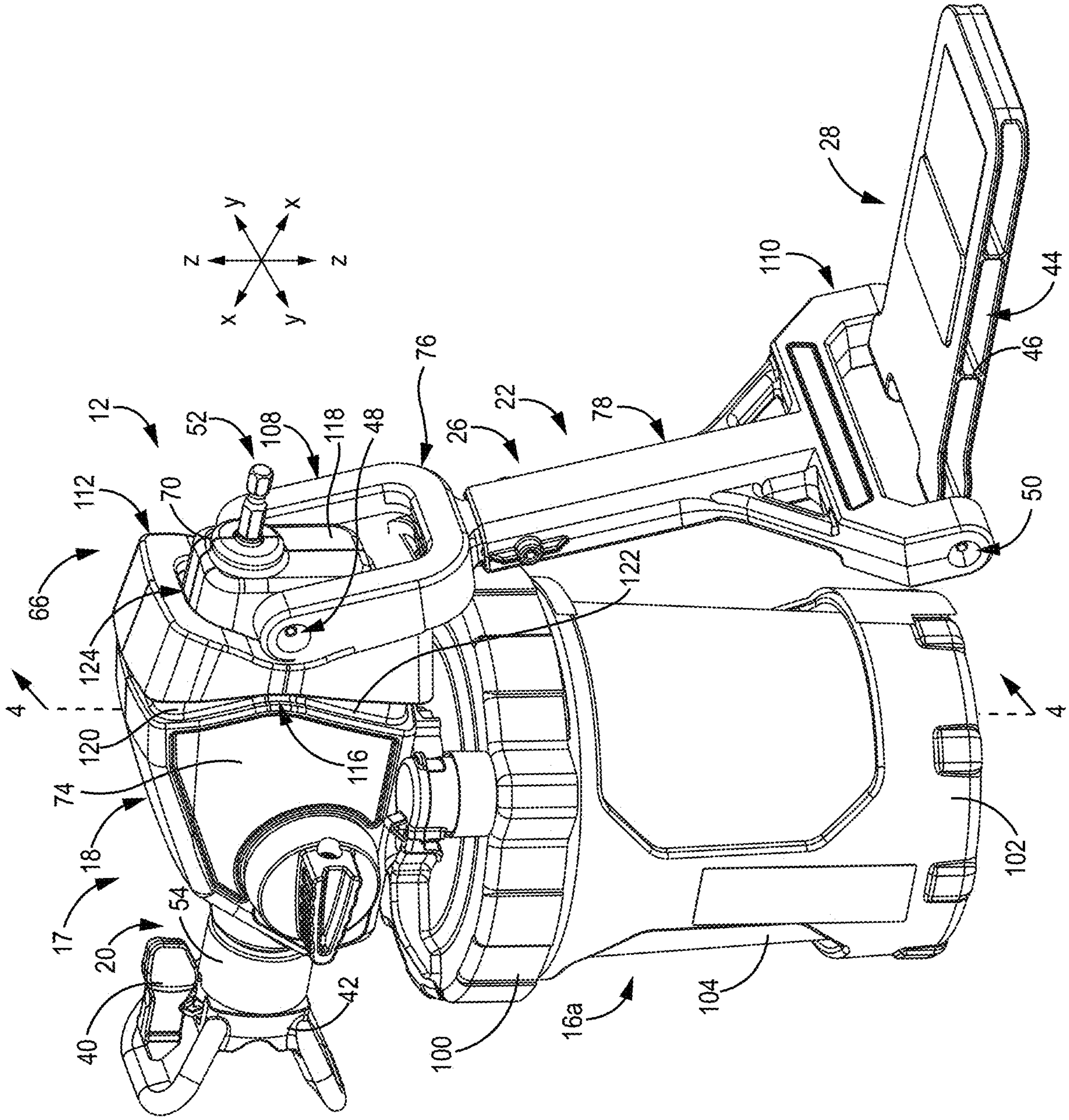
FIG. 3 is an isometric view of power tool appliance.
Figure 4A:
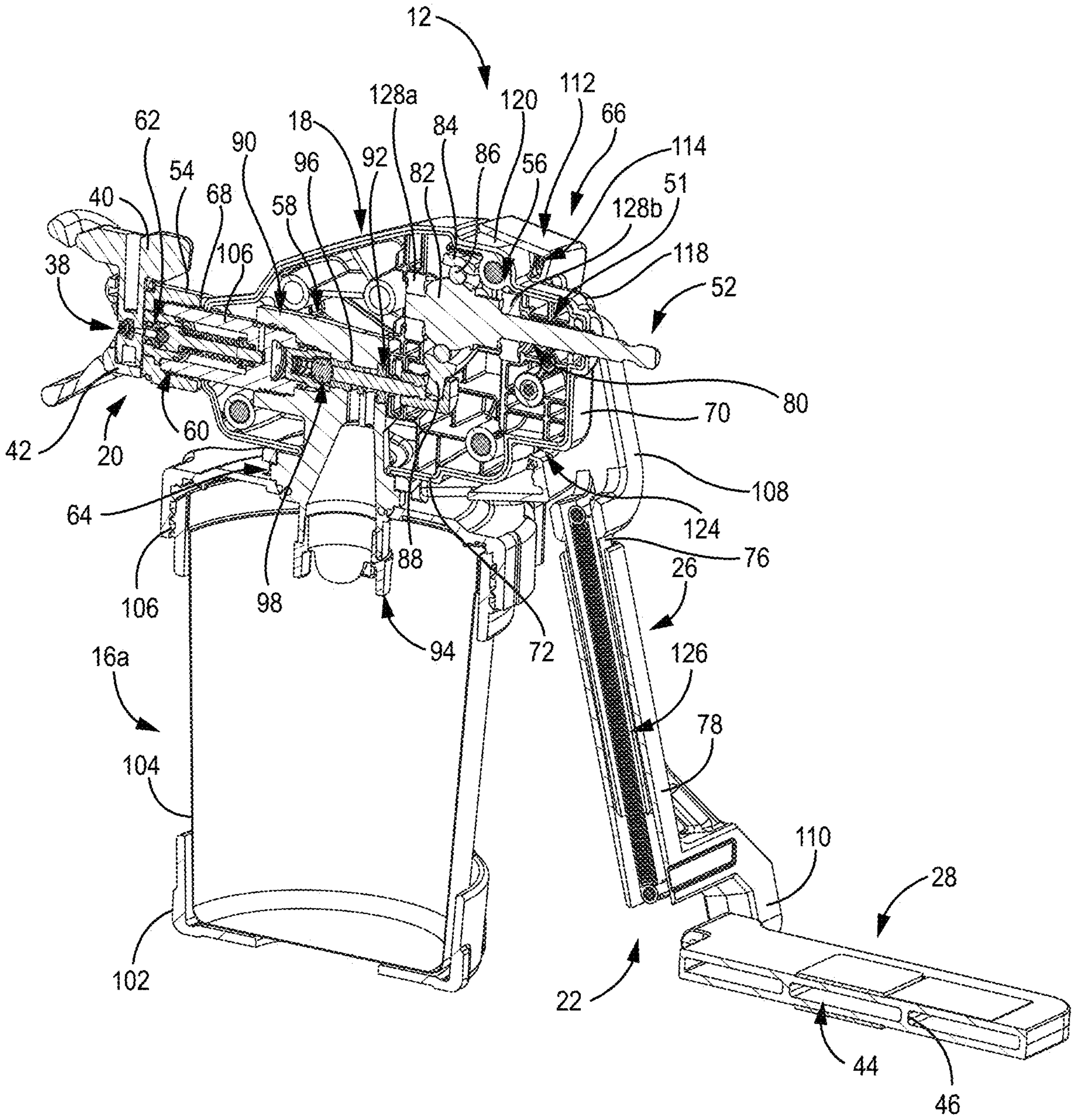
FIG. 4A is an isometric cross-sectional view taken along line 4-4 in FIG. 3.
Figure 4B:
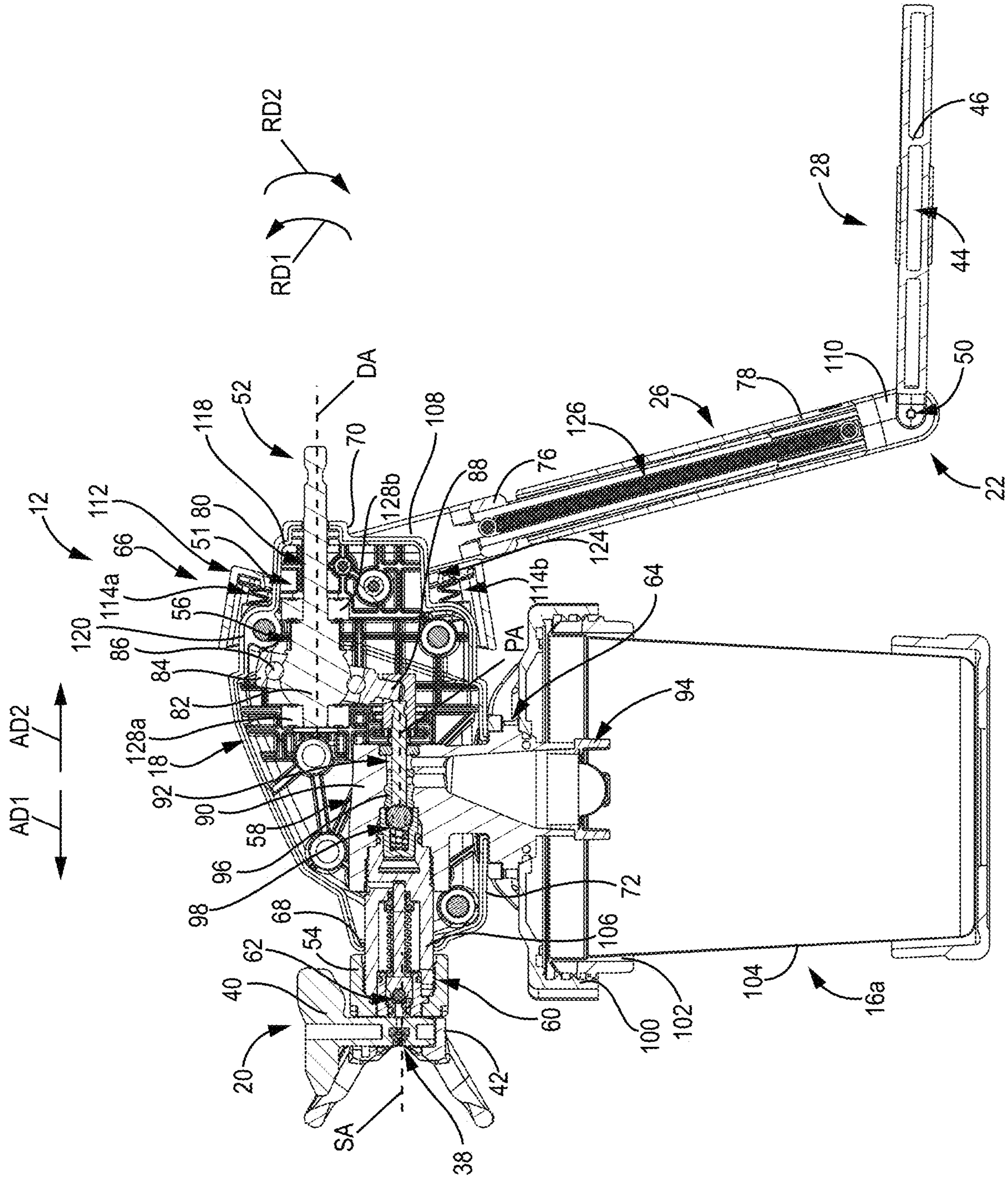
FIG. 4B is a cross-sectional view taken along line 4-4 in FIG. 3.
Figure 5:
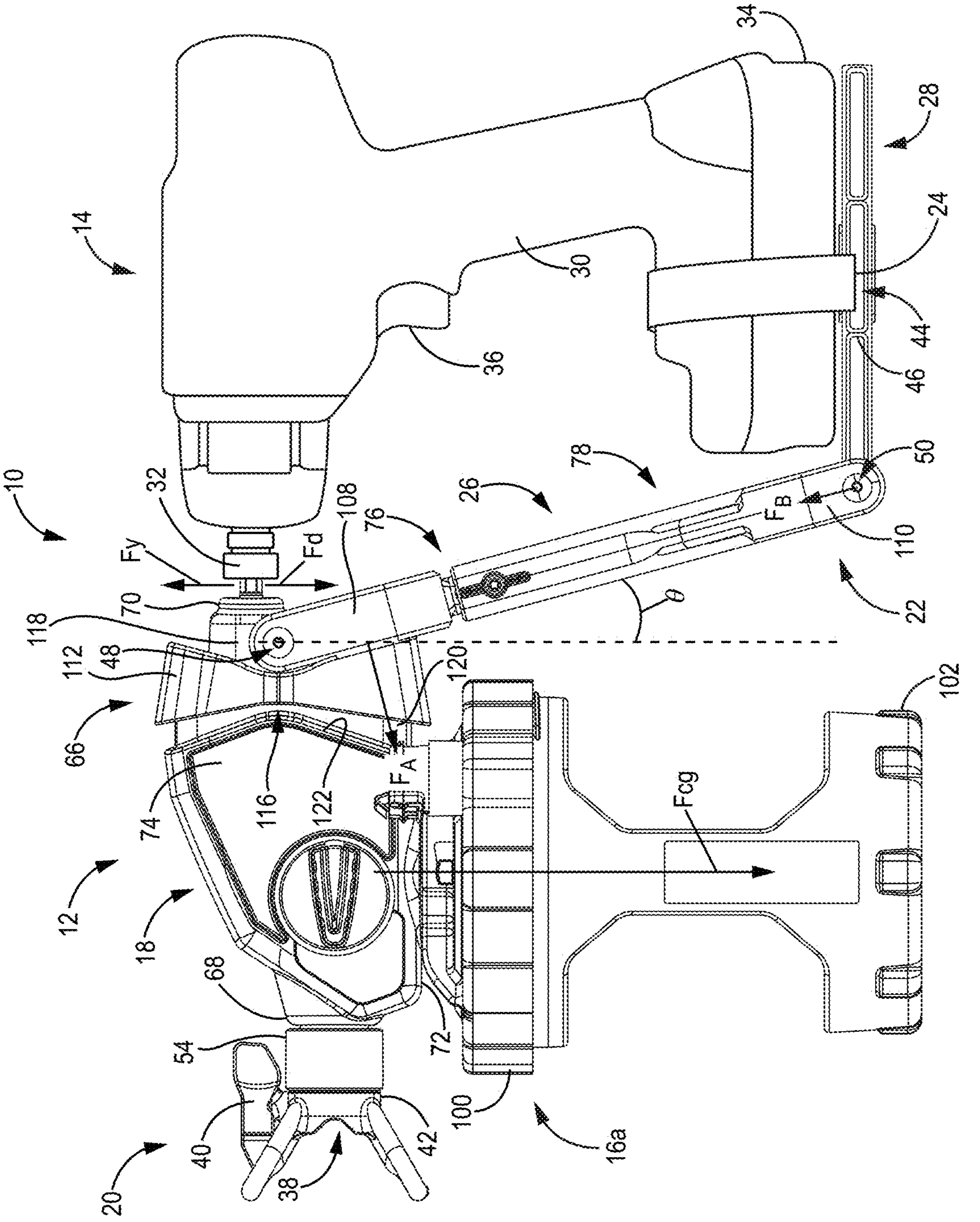
FIG. 5 is a side elevational view of the power tool system showing preloading of the power tool.

FIG. 3 is an isometric view of power tool appliance 12. FIG. 4A is an isometric cross-sectional view of power tool appliance 12 taken along line 4-4 FIG. 3. FIG. 4B is an elevational cross-sectional view of power tool appliance 12 taken along line 4-4 in FIG. 3. FIG. 5 is a side elevational view of tool system 10. FIGS. 2A, 2B, 3, 4A, 4B and 5 are discussed together. Housing 18, tip assembly 20, support assembly 22, input shaft 52, drive 56, pump 58, spray valve 62, connector 64, shaft aligner 66, and reservoir 16*a* are shown. Front side 68, rear side 70, reservoir side 72, and lateral side 72 of housing 18 are shown. Spray outlet 38, spray tip 40, and tip housing 42 of tip assembly 20 are shown. Arm 26 and mount 28 of support assembly 22 are shown. Upper arm extension 76, lower arm extension 78, and tensioner 126 of arm 26 are shown. Drive shaft 80, drive body 82, outer ring 84, balls 86, and output 88 of drive 56 are shown. Pump body 90, piston 92, pump inlet 94, cylinder 96, and outlet valve 98 of pump 58 are shown. Lid 100, cup 102, and liner of reservoir 16*a* are shown. Longitudinal directions X-X, lateral directions Y-Y, and vertical directions Z-Z are indicated in FIG. 3.

Housing 18 supports and/or encloses and/or connects together other components of power tool appliance 12. Drive 56 is at least partially disposed within housing 18. Drive 56 is configured to convert a rotational input from the power tool 14 into a linear reciprocating output. The reciprocating output from the drive 56 is provided to the pump 58 to power pumping by the pump 58. Drive 56 can connect directly to the power tool 14, such as via input shaft 52, in some examples. Drive 56 can be configured similar to or the same as drive 6.

Drive shaft 80 is configured to receive the rotational input from the power tool 14. In the example shown, the drive shaft 80 forms part of the drive 56 and thus participates in converting rotational motion to linear reciprocating motion. In the example shown, drive 56 is formed as a wobble drive, through it is understood that various other types of drives are possible, such as eccentric and crank arm.

The drive shaft 80 can form at least part of a bearing which converts continuous rotational motion to irregular motion due to the tilted orientation and positioning of the outer ring 84 on the drive shaft 80. Balls 86 are disposed between drive shaft 80 and outer ring 84. The balls 86 ride in corresponding grooves on the drive shaft 80 and the outer ring 84. The grooves are canted relative to a plane orthogonal to the drive axis DA. Such a configuration causes the outer ring 84 to rock as the drive shaft 80 rotates on the drive axis DA. Such rocking causes the output 88 of the drive to reciprocate and thus causes reciprocation of the piston 92 of the pump 58. In the example shown, the output 88 is formed as a projection that extends from the outer ring 84, though it is understood that not all examples are so limited.

Drive shaft 80 is rotatably supported by bushings 128*a*, 128*b*. Bushings 128*a*, 128*b* are disposed on opposite axial sides of the bearing interface between drive shaft 80 and outer ring 84. The bushings 128*a*, 128*b* are disposed on opposite axial sides of the drive body 82 of the drive shaft 80 along the axis DA of the drive 56. The drive body 82 forms an enlarged portion of the drive shaft 80 configured to interface with the balls 86 and including the groove that the balls 86 ride in. The input shaft 52 extends in axial direction AD2 from the drive body 82. The input shaft 52 is cantilevered from the rearward bushing 128*b*. The rearward bushing 128*b* is disposed axially between the input shaft 52 outside of housing 18 and the drive body 82.

Input shaft 52 is connected to drive 56. The input shaft 52 can be considered to form a portion of the drive 56. Input shaft 52 extends out a rear side 70 of housing 18 such that input shaft 52 can extend into a power tool 14 to connect to the power tool 14. Input shaft 52 is configured to form a dynamic mechanical connection with the power tool 14 to receive rotational input from the power tool 14. In the example shown, the drive shaft 80 also forms the rotational input shaft 52 which extends outside of the housing 18. The input shaft 52 is cantilevered out from the rear side 70 of the housing 18.

The drive shaft 80 and input shaft 52 are formed monolithically in the example shown. As such, in various examples, a single piece of metal (e.g., steel) that forms the input shaft 52 also forms part of the drive 56 and participates in converting rotational motion into reciprocating motion, instead of merely transmitting rotational motion from one area to another area. Having the input 51 (including the drive shaft 80 and input shaft 52) of the drive 56 be one piece simplifies manufacturing and allows this part to be made from higher strength material being that this part must both interface with a variety of different power tools 14, side load and/or preload, transmit rotational torque, and directly participate in converting rotational motion into linear reciprocating motion.

The drive 56 converts rotational motion received from the power tool 14 into linear reciprocating motion. The linear reciprocating motion can reciprocate the piston 92 to pump the fluid, such as providing suction to move the fluid from the reservoir 16*a* and further driving the fluid through spray valve 62 and out the spray outlet 38. The fluid exits from within housing 18 through the front side 68 of housing 18. While drive 56 is shown as being operatively connected to a piston 92, it is understood that drive 56 can be connected to any desired fluid displacer configured to reciprocate to pump the fluid, such as a piston or diaphragm.

It is noted that the drive 56 does not include any gearing or gears in the example shown. Further, the entirety of the power tool appliance 12 does not include any gears. Therefore, each rotation of the input shaft 52 by the power tool 14 results in one reciprocation of the piston 92, in a 1:1 ratio. A single rotation of the input shaft 52 can cause the piston 92 to displace in both a forward axial direction AD1 and through a pressure stroke and a rearward axial direction AD2 and through a suction stroke, thereby causing the piston 92 to move through one pump cycle. It is understood, however, that various other embodiments may include gearing.

Pump 58 is supported by housing 18. Pump 58 can be at least partially disposed within housing 18. In some examples, pump 58 is fully disposed within housing 18. Pump body 90 supports other components of pump 58. Pump body 90 further defines fluid pathways for fluid to flow between reservoir 16*a* and spray outlet 38. In some examples, the fluid output from reservoir 16*a* is received directly into the pathways within pump body 90, the fluid is then output from the pump body 90 and to the valve assembly 60 that includes spray valve 62 before flowing downstream to and through spray outlet 38.

Piston 92 is at least partially disposed within pump body 90. Piston 92 is configured to reciprocate on pump axis PA to pump the spray fluid from reservoir 16*a* and downstream through spray outlet 38. Piston 92 is connected to drive 56 to receive the reciprocating output from drive 56. Piston 92 is connected to output of drive 56 to receive the reciprocating motion from drive 56. Piston 92 is configured to displace in rearward axial direction AD2 during a suction stroke in which fluid is drawn from reservoir 16*a* and into pump 58. Piston 92 is configured to displace in forward axial direction AD1 during a pressure stroke to pressurize the fluid and drive the fluid downstream under pressure for emission through spray outlet 38. While pump 58 is shown as a piston pump, it is understood that not all examples are so limited. Further, while pump 58 is shown as a single piston pump, it is understood that not all examples are so limited. For example, pump 58 can be configured to include a plurality of pistons 92 (e.g., two, three, or more). The multiple pistons can be reciprocated out of phase with respect to each other to pump the spray fluid. Each of the multiple pistons can be connected to a separate output 88 of the drive 56 to be reciprocatingly displaced by the drive 56.

The fluid contacting portion of piston 92 is connected indirectly to the drive 56 in the example shown. A forward portion of piston 92, which can be metallic, reciprocates and contacts the fluid to pump the fluid. A rearward portion of piston 92, which can be formed from polymer, interfaces with output 88 to receive the reciprocating motion from output 88. The irregular motion of the output 88 forward and rearward (while the outer ring 84 is not allowed to rotate with the drive shaft 80) pushes and pulls the piston 92 forward and rearward in a reciprocating motion to pump the fluid, or provide another reciprocating function in alternative examples.

Cylinder 96 is disposed within pump body 90. The piston 92 reciprocates within cylinder 96 to pump the fluid. The cylinder 96 can, in some examples, be formed separately from the pump body 90. For example, the cylinder 96 can be formed from metal, such as tungsten carbide, while pump body 90 can be formed from polymer. Cylinder 96 can be considered to define a pump chamber in which the spray fluid is pressurized during the pumping stroke of the piston 92.

Outlet valve 98 is disposed downstream of the piston 92. Outlet valve 98 is disposed downstream of the pump chamber. Outlet valve 98 is configured as a one-way valve that allows spray fluid to flow downstream from the pump chamber while preventing retrograde flow to the pump chamber. In the example shown, the outlet valve 98 is configured as a spring-biased normally-closed ball check valve.

Spray valve 62 is disposed downstream of piston 92. Spray valve 62 is disposed downstream of pump 58. Spray valve 62 is normally closed. Valve housing 106 is mounted to pump body 90. Spray valve 62 is disposed within valve housing 106. In the example shown, the spray valve 62 includes a valve spring 114 that maintains the spray valve in a closed state. The spray valve 62 can be configured such that the fluid pressure reaching a threshold overcomes the force of the spring and causes the spray valve 62 to open, allowing spray fluid to flow downstream to and through spray outlet 38.

Tip assembly 20 is mounted to valve housing 106 in the example shown. Tip housing 42 is mounted to valve housing 106 by collar 54 in the example shown. Spray tip 40 is rotatably mounted within tip housing 42. Tip housing 42 is rotatable relative to collar 54 on spray axis SA, which is the axis along which the spray outlet 38 is configured to output the spray fluid. Spray outlet 38 is formed as a nozzle through the spray tip 40.

Pump 58 is configured to receive spray fluid through pump inlet 94. The piston 92 is reciprocated by the drive on the piston axis PA. The piston axis PA is radially offset from the drive axis DA in the example shown. Reciprocation of the piston 92 draws spray fluid from reservoir 16*a* through pump inlet 94. The spray fluid is pressurized and driven downstream through outlet valve 98, spray valve 62, and spray outlet 38 to be sprayed on the target surface. In the example shown, the piston 92, spray valve 62, and spray outlet 38 are disposed coaxially on the piston axis PA such that the spray axis SA and piston axis PA are disposed coaxially, though it is understood that not all configurations are so limited. In some examples, pump 58 includes at least one piston 92 disposed coaxially with the spray outlet 38 and includes one or more other pistons disposed to reciprocate on axes offset from the spray axis SA.

The piston 92 is vertically offset from the drive axis DA. In some examples, the piston 92 can be offset from the drive 56 and be disposed to radially overlap with the rotating components of the drive 56.

In some examples, the piston 92 and drive 56 can be vertically aligned. For example, the drive axis DA and the axis PA can be disposed coplanar in an X-Z plane. Such a configuration can provide for efficient force transmission while also providing for a compact configuration of power tool appliance 12.

The piston 92 is disposed vertically below the drive 56 with the power tool appliance 12 in the suction feed state. The piston 92 is disposed vertically below the drive axis DA with the power tool appliance 12 in the suction feed state.

Figure 7A:
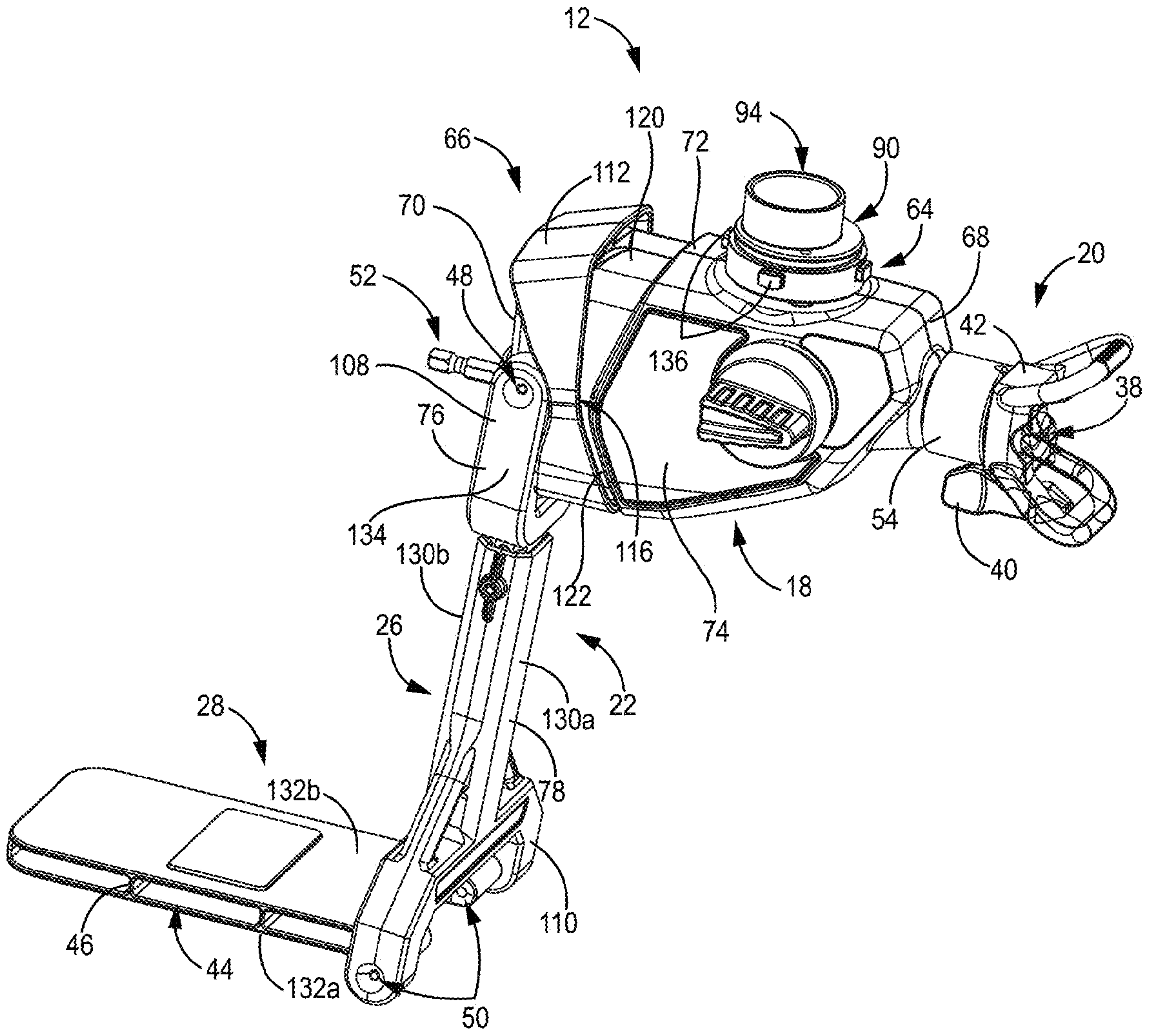
FIG. 7A is an isometric view of the power tool appliance in a gravity feed state.
Figure 7B:
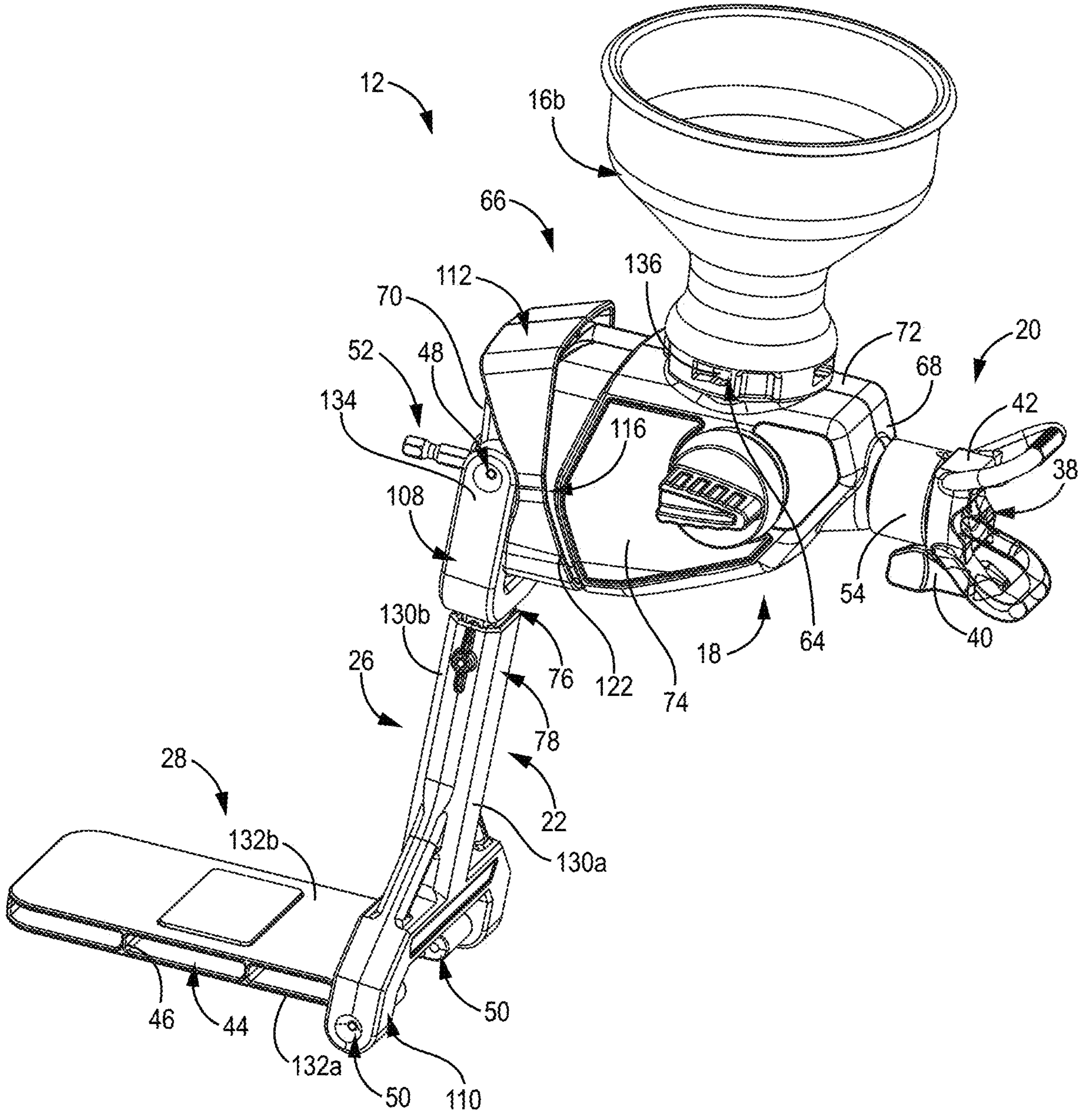
FIG. 7B is an isometric view of the power tool appliance in the gravity feed state and showing a reservoir connected to the power tool appliance.

The piston 92 is disposed vertically above the drive 56 with the power tool appliance 12 in the gravity feed state (FIGS. 7A-7B). The piston 92 is disposed vertically above the drive axis DA with the power tool appliance 12 in the suction feed state.

Reservoir 16*a* is configured to store a supply of the spray fluid for use during spraying. Reservoir 16*a* is supported by housing 18. In the example shown, the reservoir 16*a* is indirectly connected to housing 18. Reservoir 16*a* is directly connected to pump body 90 in the example shown to connect to and be supported by housing 18.

Cup 102 is configured to house the spray fluid. In some examples, a collapsible liner 104 can be disposed in cup 102 and the fluid can be within the collapsible liner 104. The collapsible liner 104 can collapse towards pump inlet 94 during operation. In other examples, the reservoir 16*a* does not include a collapsible liner 104. In such examples, a suction tube can extend from pump inlet 94 to or proximate the bottom end of the reservoir 16*a*. Lid 100 is connected to cup 102. Lid 100 can connect the collapsible liner to cup 102. Lid 100 can connect reservoir 16*a* to power tool appliance 12.

The power tool appliance 12 includes a connector 64. The connector 64 can connect directly to the reservoir 16*a*. The connector 64 can include threading, bayonet structure, tabs or slots (for complement tab-and-slot mating) or other fixation complementary with that of the reservoir 16*a*. In the example shown, the connector 64 is formed as a portion of the pump body 90. The connector 64 interfaces with complementary structure formed in the lid 100 of the reservoir 16*a* in the example shown. Pump inlet 94 extends from connector 64 in the examples shown, though it is understood that not all examples are so limited. In various other examples, the pump inlet 94 and connector 64 can be separated. The connector 64 can attach to reservoir 16*a* or other type of fluid reservoir. The connector 64 in this example is a bayonet type, however threading, press fit, lever, tab and groove, or other options are possible.

Support assembly 22 is connected to housing 18. Support assembly 22 is configured to statically interface with the power tool 14 to statically connect the power tool 14 to the power tool appliance 12. The support assembly 22 can connect the power tool appliance 12 and power tool 14 together such that the power tool 14 can provide the rotational input to the power tool appliance 12 at the dynamic interface with input shaft 52. In the example shown, the support assembly 22 is movable relative to housing 18 and is reconfigurable to accommodate different sizes and configurations of power tool 14.

Arm 26 is connected to housing 18 at arm pivot 48. In the example shown, the arm 26 extends along an arm axis AA that is repositionable relative to both the housing 18 and mount 28. Arm 26 extends between and connects housing 18 and mount 28. Mount 28 is connected to an outer end of arm 26 at mount pivot 50. Mount 28 can be repositioned relative to arm 26 by pivoting at mount pivot 50.

Upper arm extension 76 is connected to housing 18. Upper arm extension 76 incudes arm yoke 108 that extends on both lateral sides 72 of the housing 18 to connect to the housing 18 at the arm pivot 48. Lower arm extension 78 is connected to mount 28. Lower arm extension 78 includes mount yoke 110 that extends on both lateral sides of the mount 28 to connect to the mount 28 at the mount pivot 50. The upper arm extension 76 and lower arm extension 78 are movable relative to each other to adjust the length of the arm 26.

In the example shown, arm 26 is repositionable between a contracted state and an extended state. In some examples, the arm 26 can be considered to be infinitely positionable between the contracted state and the extended state, as arm 26 can be adjusted to any position between and including positions associated with the contracted and extended states. In the example shown, the upper arm extension 76 and the lower arm extension 78 are disposed in a telescoping configuration, though it is understood that not all examples are so limited. Upper arm extension 76 extends within lower arm extension 78 and the upper arm extension 76 and lower arm extension 78 are configured to relatively slide to change the length of the arm 26. Upper arm extension 76 is received within the lower arm extension 78 and the upper arm extension 76 moves within the lower arm extension 78, although this receiving convention can be reversed. Such movement allows the arm 26 to be lengthened or shortened to accommodate power tools 14 of different sizes.

Tensioner 126 is configured to urge arm 26 towards the contracted or shortened state. Tensioner 126 is formed as a spring in the example shown. Tensioner 126 is disposed within arm 26 in this example, through it is understood that not all examples are so limited. Tensioner 126 is connected to both upper arm extension 76 and lower arm extension 78 to urge the lower arm extension 78 towards housing 18. The tensioner 126 is shown as a spring, such as a metal spring, but it is understood that tensioner 126 can be formed in any suitable configuration for urging arm 26 towards the contracted state, such as an elastic band among other options.

Tensioner 126 can maintain the arm 26 at the desired length to accommodate whichever power tool 14 is connected to power tool appliance 12. For example, the lower arm extension 78 can be pulled to a length that accommodates the power tool 14 and the power tool 14 can be connected to the mount 28, such as by the fixation 24 and before or after pulling the arm 26 to the desired length. The tensioner 126 pulls the lower arm extension 78 towards the housing 18. The mount 28 being connected to the power tool 14 limits such retraction of the lower arm extension 78 while the tensioner 126 continues to pull the lower arm extension 78 towards the housing 18, thereby loading the static interface for a tight fit between power tool 14 and power tool appliance 12. Such a configuration can prevent sag and play between power tool 14 and power tool appliance 12, providing for more ergonomic and efficient operation.

Shaft aligner 66 is configured to bias the output of power tool 14 that connects to the input shaft 52 (e.g., clamp 32) into coaxial alignment with the input shaft 52 on drive axis DA. Such a configuration maintains concentricity and inhibits side-loading of the output of the power tool 14, which can prevent the power tool 14 from going into an impact driving mode (e.g., when power tool 14 is formed by an impact driver).

In the example shown, shaft aligner 66 includes strut 112 that is supported by housing 18. Strut 112 is movable relative to housing 18. In the example shown, strut 112 is mounted to housing at strut pivot 116 such that strut 112 can pivot on and relative to housing 18. Strut 112 is configured to interface with arm 26 to bias arm 26 vertically upwards and rearwards relative to input shaft 52. Strut 112 is configured to interface with arm 26 to bias arm 26 vertically upwards and rearwards relative to housing 18.

Springs 114 interface with strut 112 to bias strut relative to housing 18. Springs 114 form biasers (e.g., biasers 7) that are configured to bias the support assembly 22 and housing 18 relative to each other. The power tool appliance 12 includes at least one biaser that is configured to bias the housing 18 and support assembly 22 to align the input shaft 52 with the power tool 14.

Springs 114 are disposed between strut 112 and housing 18 in the example shown. The springs 114 are configured to resist movement of the arm 26 towards the housing 18. In the example shown, shaft aligner 66 includes upper spring 114*a* and lower spring 114*b* disposed on opposite vertical sides of the drive axis DA. It is understood that, in various examples, the shaft aligner 66 can include a plurality of the upper springs 114*a* and/or a plurality of the lower springs 114*b*. While shaft aligner 66 is shown as including both upper springs 114*a* and lower springs 114*b*, it is understood that not all examples are so limited. For example, shaft aligner 66 may include only a single upper or lower spring 114, such as in configurations in which power tool appliance 12 is not configured to invert between suction and gravity feed configurations.

Strut 112 is configured to interface with arm 26. Springs 114 resist movement of strut 112, and thus of arm 26 and the power tool 14 mounted to arm 26, vertically downward and forward relative to drive axis DA. Strut 112 can be considered to resist movement of the housing 18 vertically downward and rearward relative to drive axis DA to maintain housing 18 and thus drive 56 and input shaft 52, aligned with the output of power tool 14. Such a configuration can inhibit side-loading that can be caused due to the weight of the spray fluid contained in the spray reservoir 16*a*.

As shown, the arm yoke 108 wraps around both lateral sides of the arm mount 118 and a pin rotationally connects the arm 26 to the arm mount 118 to facilitate rotation of the arm 26 relative to the housing 18. The strut 112 is mounted on a strut mount 120. The strut mount 120 can be a narrower portion of the housing 18, or can be a separate structure. The strut mount 120 can be defined in part by a ridge 122 against which the strut 112 can bottom out against when pivoting, however other options are possible. In the example shown, ridge 122 is oriented transverse to a horizontal X-Y plane. Ridge 122 is non-orthogonal to the horizontal X-Y plane. Ridge 122 is sloped such that ridge 122 is oriented to face vertically upward to resist movement of the strut 112. In the example shown, a plurality of ridges 122 are formed due to power tool appliance 12 being invertible. The multiple ridges 122 are disposed in a chevron configuration on the lateral side 74 of the housing 18. The chevron tip is oriented rearward. The ridges 122 extend vertically and longitudinally forward relative to the tip of the chevron.

In the example shown, strut 112 is a ring-like structure which defines a strut aperture 124. In such a structure, the rotational input shaft 52 can extend through the aperture 124. Furthermore, a part of the housing 18 can extend through the aperture 124. Arm mount 118 extends within aperture 124 in the example shown. The arm mount 118 extends through aperture 124 and is configured to interface with the arm pivot 48. The arm mount 118 can be part of the housing 18 or can be separate from the housing 18. The arm mount 118 can include an attachment to the arm 26, such as one or more pins which facilitate fastening while allowing hinge motion.

The views of FIGS. 2A, 2B, 3, 4A, 4B and 5 demonstrate several aspects which can enhance the function of the tool system 10 or other type of power tool appliance 12. Such features can be useful for getting a proper fit of the power tool 14 with the power tool appliance 12 considering that a single power tool appliance 12 should be usable with a large variety of slightly different types of power tools 14. In particular, such different types of power tools 14 can be different dimensions and thus aligned with the rotational input shaft 52 slightly differently. Moreover, impact drivers and various other types of power tools 14 operate best when loaded with an axial force along the rotational input shaft 52. For example, impact drivers can (mechanically) enter an impact function, which can include unwanted hammering action, depending on load transmitted through the rotational input shaft 52, which is also dependent on the orientation of the power tool 14 relative to the rotational input shaft 52. Such hammering action of the impact function may be ideal for drilling screws into wood as the intended application of the power tool 14, but may not be ideal for spraying applications or other uses of the power tool appliance 12, and is ideally avoided. Side-loading of the rotational input shaft 52 can encourage entry into impact function. Various features of power tool appliance 12 can help facilitate proper loading, and avoid such side-loading or other factors which contribute to entry into impact function, such as by keeping the hammer of the power tool 14 from slipping, to avoid or minimize entry into the impact function, as further discussed herein.

As shown in FIG. 5, the weight of the power tool appliance 12 exerts a downward force Fd that is experienced at the dynamic mechanical interface between power tool appliance 12 and power tool 14. The downward force Fd can vary during operation, such as due to the volume of fluid within reservoir 16*a* decreasing during spray operations. The downward force Fd is generated by the weight of the output assembly 17. The center of gravity Fcd exerts downward force, which can vary. The location of the center of gravity Fed can shift longitudinally due to the changing fluid volume in the example shown. In the example shown, the center of gravity Fed is disposed on an opposite longitudinal side of the shaft aligner 66 from the support assembly 22.

An upward force Fy is generated that counteracts the downward force Fd exerted by the power tool appliance 12. The upward force Fy concentrically aligns the rotational output from the power tool 14 and the rotational receiver (e.g., input shaft 52) of the output assembly 17. A pre-tensioner is configured to exert upward forces Fy that counteract the downward force Fd, preventing side-loading. In the example shown, shaft aligner 66 includes springs 114 such that the upward force Fy is variable to account for the variable downward force Fd.

The arm 26 can adjust in length, to be longer or shorter. Tensioner 126 urges the arm 26 to be shorter. Such tensioning can exert force Fb that has an upward component to maintain loading between the power tool appliance 12 and the power tool 14 which avoids entry into the impact function. The tensioner 126 is attached to each of the upper arm extension 76 and the lower arm extension 78 to urge them together and/or toward greater overlap. It is noted that tensioner 126 can also maintain pressure on the power tool 14 via the rotational input shaft 52 to maintain proper load. This is because the tensioner 126 pulls the mount 28 (generally) toward the input shaft 52, which due to the base of the power tool 14 being fixed to the mount 28, this urges the power tool 14 vertically upward, which helps to preload the power tool 14 and counteract the downward force Fd of the power tool appliance 12. Such pressure when properly maintained can help avoid entry into the impact function.

While the arm 26 includes tensioner 126, various other features are provided which can help avoid entry into impact function in a complementary or independent fashion with respect to the tensioner 126. It is noted that the tensioner 126 may not be included in various embodiments.

As previously mentioned, the arm 26 pivots with respect to the housing 18. Such pivoting can provide different alignments of the power tool 14 with respect to the rotational input shaft 52 and the housing 18. The pivoting can change the angle θ between arm 26 and a vertical axis VA. Such variation in the angle θ can affect the force exerted by shaft aligner 66, such as by strut 112. Furthermore, pressure can be maintained on the arm 26 to maintain, or be urged into, an orientation which fosters proper alignment of the power tool 14 relative to the rotational input shaft 52. Shaft aligner 66 exerts force Fa that is upward and forward to bias the housing upward and forward relative to the power tool 14. Such force Fa can counteract at least a portion of the downward force Fd exerted by the power tool appliance 12. During operation, the user holds the power tool 14 by the handle 30 of the power tool 14. The power tool 14 and power tool appliance 12 are held stationary relative to each other, such that the power tool 14 does not cause rotation of the power tool assembly 12, by the static interface between housing 18 and power tool 12 formed through support assembly 22. The power tool 14 is also dynamically connected to the output assembly 17 at the dynamic interface with the input shaft 52. The force Fed pulls down on the output assembly 17 to pull housing 18, and thus the input shaft 52 that is supported within housing 18, in rotational direction RD1 about arm pivot 48. The shaft aligner 66 exerts a counteracting force Fa that resists pivoting of housing 18 and urges output assembly 17 in rotational direction RD2. The vertical force components can cancel out to prevent side loading on the driveshaft of the power tool 14.

The power tool appliance 12 includes one or more biasers (e.g., springs 114, tensioner 126) that are configured to align support assembly 22 and housing 18 relative to each other. The biaser can be configured to set an angle of the support assembly 22 relative to the housing 18. For example, the biaser can be configured to set an angle θ of the arm 26. In the example shown, the biaser that sets angle of the arm 26 is formed by spring 114. The biaser can be configured to set a length of the support assembly 22. For example, the biaser can be configured to set a length of arm 26. In the example shown, the biaser that sets the length of the arm 25 is formed by tensioner 126. The biaser can thereby align the power tool 14 and housing 18 to align the input shaft 52 with the power tool 14 output.

The one or more biasers of the power tool appliance 12 are configured to preload the dynamic interface between the power tool appliance 12 and the power tool 14. The biaser can preload the dynamic interface by biasing the power tool 14 vertically upward. The biaser can preload the dynamic interface by biasing the arm 26 towards a contracted state. For example, the tensioner 126 can pull the mount 28 to bias the power tool 14 vertically upward while the dynamic interface is fixed between the input shaft 52 and the power tool 14. The biaser can preload the dynamic interface by biasing the housing 18 upward and into alignment with the power tool 14. The biaser can preload the dynamic interface by biasing the support assembly 22 and housing 18 away from each other. For example, the springs 114 can bias the housing 18 vertically upward and longitudinally away from the support assembly 22 while the dynamic interface is fixed between the input shaft 52 and the power tool 14. Preloading the dynamic interface provides for a secure connection between power tool 14 and power tool appliance 12 that provides for efficient and easy spray operations.

In the example shown, a pivot urges alignment. The pivot can be considered to urge the arm 26 or the housing 18 relative to the other one of the arm 26 and the housing 18. The pivot can be strut 112. Strut 112 can be considered to form the pivot plate. Strut 112 can be a support. The pivot can be urged, such as by springs 114. In this particular embodiment, the strut 112 engages the arm 26 as urged by the spring 114. The spring 114 urges the strut 112 away from, or rotationally upward, with respect to the housing 18. This engages the arm 26 and urges the arm 26 rotationally upwards, which supports and aligns the power tool 14 connected to the arm 26 (e.g., via the mount 28). While shaft aligner 66 is shown as including strut 112, it is understood that not all examples are so limited. For example, shaft aligner 66 can include one or more discrete projections or other structure that is spring biased to exert the force Fa on output assembly 17.

Spring 114 pushes off from housing 18 or other structure to urge the strut 112 away from the housing 18. The strut 112 is rotationally fixed directly to the housing 18 or indirectly relative to the housing 18 (e.g., in either case via pivoting connecting such as via pins, axles, bearings, and/or other type of connection which facilities relative rotation while still retaining the strut 112) such that the urging by the spring 114 pushes the strut 112 to rotate about the strut pivot 116. It is noted that the strut 112 may not pivot and may instead translate linearly or other motion, such that pivoting of the strut 112 is not the only range of motion that various different struts may undergo. The strut 112 urges, directly by direct contact or indirectly in the case of an intermediary component, the housing 18 as the strut 112 itself is urged by the spring 114. The arm 26 is pivotally connected directly to the housing 18 or pivotally fixed with respect to the housing 18 (and indirectly connected to the housing 18) such that the force Fa urges the arm 26 and/or housing 18 to swing or otherwise rotate upwards toward the input shaft 52 by the force Fa. Being that the power tool 14 is supported by the arm 26, or indirectly connected to the arm 26, such urging of the housing 18 pushes the output assembly 17 upwards. Such pushing can optimally position the power tool 14 and/or preload the power tool 14 via the input shaft 52.

In the example shown, the upper springs 114*a* and lower springs 114*b* can work in concert to generate the biasing force Fa. With power tool appliance 12 in the suction feed orientation (shown in FIG. 5), the lower springs 114*b* can push the strut 112 in rotational direction RD1 about the pivot of the strut 112. The lower springs 114*b* can be considered to push the housing 18 in rotational direction RD2. The upper springs 114*a* can be connected to strut 112 and housing 18 such that upper springs 114*a* pull on housing 18 to also exert force to urge housing 18 in rotational direction RD2. With power tool appliance 12 in the gravity feed orientation (shown in FIGS. 7A and 7B), the upper springs 114*a* can push the strut 112 in rotational direction RD2 about the strut pivot 116. The lower springs 114*b* can be considered to push the housing 18 in rotational direction RD1. The lower springs 114*b* can be connected to strut 112 and housing 18 such that lower springs 114*b* pull on housing 18 to also exert force to urge housing 18 in rotational direction RD1. The upper springs 114*a* and lower springs 114*b* can thus work together to generate the biasing force Fa.

The combination of the upward force components of the forces Fa and Fb can combine to form the upward force Fy that balances with the downward force Fd. Such a configuration inhibits side-loading on the input shaft 52 and power tool 14, maintaining power tool 14 in a desired operating mode and decreasing the force required by power tool 14 to drive input shaft 52, which can allow for longer battery life and thus longer continuous operation of power tool appliance 12.

When the power tool 14 is mounted, the tensioner 126 and the springs 114 can work together to find a balance and proper alignment between the power tool 14 and the rotational input shaft 52. In some examples, the spring forces can oppose each other. As such, the tensioner 126 and spring 114 can be in partial opposition to each other as the tensioner 126 pulls the power tool 14 nearer to the housing 18 and the spring 114 urges the power tool 14 upwards and partially away from the housing 18 due to the swinging motion of the arm 26. It is understood, however, that not all examples are so limited.

The power tool appliance 12 is connected to mount 28 to form a static connection between power tool 14 and power tool appliance 12. For example, fixation 24 can extend through slot 44 in mount 28 and be wrapped around the base of power tool 14 to fix power tool 14 on mount 28, among other connection options. The power tool 14 is connected to power tool appliance 12 by a dynamic connection interface that mechanically powers operation of power tool appliance 12. The input shaft 52 interfaces with the power tool 14 at the dynamic mechanical interface to receive the rotational output from the power tool. As discussed above, the shaft aligner 66 and tensioner 126 can bias power tool 14, via arm 26, to align input shaft 52 and power tool 14 during operation.

During operation, the power tool 14 is powered to provide a continuous rotational output in a single rotational direction. It is understood that, in the example shown, the power tool 14 can be caused to rotate clockwise or counterclockwise and will cause pumping by pump 58 and spraying of fluid in either configuration.

The rotation from the power tool 14 is provided to the input shaft 52 which is rotated on the drive axis DA. The input shaft 52 and drive body 82 rotate together, such as due to being formed monolithically. The rotating drive body 82 causes reciprocation of the drive output 88, due to the canted bearing races between drive body 82 and outer ring 84 in this example. In the example shown, the drive 56 extends along the drive axis DA. The input shaft 52 is configured to receive the rotational input for drive 56. The drive body 82 is configured to rotate to provide an output from drive 56, rotation of drive body 82 causing reciprocation of the piston 92. In the example shown, the rotational input and the rotational output of the drive 56 are disposed coaxially. In the example shown, the rotational input and the rotational output of the drive 56 are contiguous.

Power tool appliance 12 provides significant advantages. In the example shown, the power tool appliance 12 provides a sprayer that can be operated by multiple different power tools 14 having different configurations. Power tool appliance 12 being operable by a power tool 14, such as a drill or impact driver, allows for the power tool 14 to perform multiple functions (e.g., powering the power tool appliance 12 for the function of the power tool appliance 12 and drilling or screwing in or out), while also decreasing the components and thus cost of the fluid-handing power tool appliance 12 relative to a sprayer having an integrated motor. In the example shown, the power tool appliance 12 does not include any electronics. The electronic components of tool system 10 are disposed on and remain with power tool 14, at a location isolated from the fluid pathways through power tool appliance 12, protecting such components from fluid contamination.

Power tool appliance 12 contains drive 56 that converts the rotational output from power tool 14 into linear reciprocating motion that powers pumping by the pump 58. Input shaft 52 includes a contoured end, hexagonal in the example shown, that facilitates formation of a keyed interface with the power tool 14 for transmitting rotational motion to the input shaft 52. The input shaft 52 is thereby contoured to receive rotational output from a variety of different power tools 14. The input shaft 52 and drive body 82 are unitary in the example shown, which increases the strength of the drive shaft 80 and can provide for greater operational life for power tool appliance 12.

Support assembly 22 facilitates mounting of various different power tools 14 having different sizes and configurations to power tool appliance 12. Arm 26 is extendable to allow the output of the power tool 14 to align with the input shaft 52 while the power tool 14 can rest on and be connected to mount 28. Tensioner 126 urges arm 26 towards the contracted state while also allowing arm 26 to be extended to any position intermediate and including the contracted state and the extended state. In some examples, support assembly 22 can include length fixers, such as clamps, fasteners, detents, etc., that fix the length of arm 26 even if the static connection between power tool appliance 12 and power tool 14 is broken.

Arm 26 can be reoriented relative to housing 18, further facilitating accommodation of multiple power tools 14 having different configurations. Mount 28 can be reoriented relative to arm 26 which also assists in accommodating multiple different power tools 14 having multiple different configurations.

The mount 28 includes multiple slots 44 through which a fixation 24 can be passed to wrap around the base of the power tool 14 and statically connect the power tool 14 to the power tool appliance 12. The static connection facilitates conversation of the rotational output to linear driving motion for driving pump 58 by preventing the power tool appliance 12 from rotating relative to power tool 14.

Shaft aligner 66, and in some examples tensioner 126, align power tool appliance 12 and power tool 14 to prevent side-loading at the dynamic interface between power tool appliance 12 and power tool 14. The shaft aligner 66 exerts a biasing force on arm 26 that counteracts the weight of power tool appliance 12 to align input shaft 52 and the output of power tool 14 coaxially. The tensioner 126 can further exert biasing force for alignment. Such a configuration prevents side-loading and can thereby prevent the power tool 14 from entering into an undesirable impact mode.

The strut 112 in the illustrated examples is able to engage the arm 26 from either a standard or inverted orientation, the standard orientation associated with the suction feed state and the inverted orientation associated with the gravity feed state. In the way, the strut 112 can engage the arm 26 from the either side of the arm 26 and can always rotate upwards to swing the arm 26 upwards regardless of whether the housing 18 is orientated for suction or gravity feed.

Figure 6:
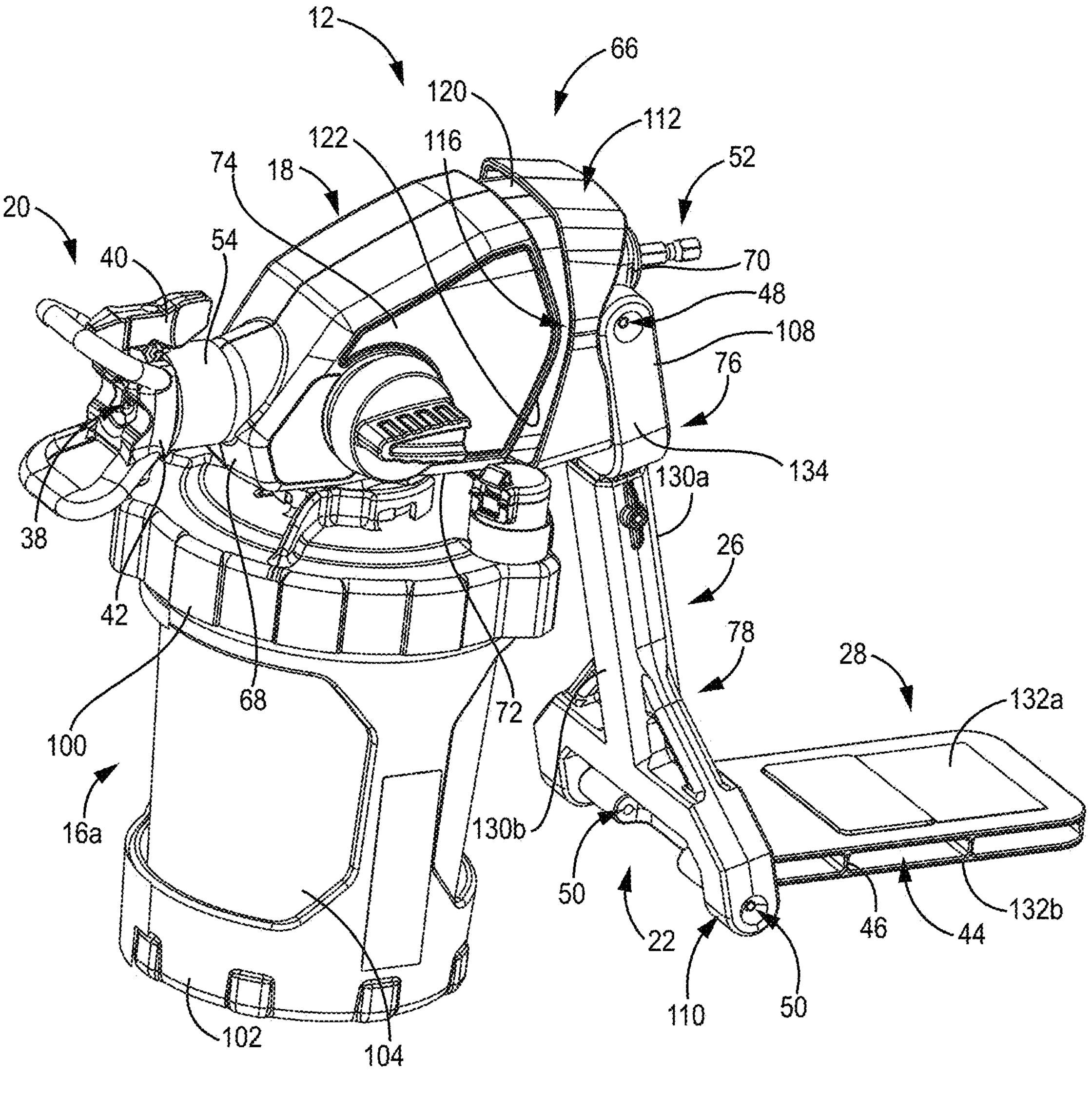
FIG. 6 is an isometric view of the power tool appliance in a suction feed state.

FIG. 6 is an isometric view of power tool appliance 12 with power tool 14 removed and configured in a suction feed state. FIG. 7A is an isometric view of power tool appliance 12 with power tool 14 removed and configured in a gravity feed state. FIG. 7B is an isometric view of power tool appliance 12 in the gravity feed state similar to FIG. 7A but with reservoir 16*b* mounted. FIGS. 6, 7A and 7B are discussed together.

Power tool appliance 12 is operable in a suction feed state, in which fluid flows upward into pump 58, and a gravity feed state, in which fluid flows downward into pump 58. In the example shown, the power tool appliance 12 is invertible between the suction feed state (FIG. 6) and the gravity feed state (FIGS. 7A and 7B). In the suction feed state, the pump inlet 94 is oriented vertically downward. In the gravity feed state, the pump inlet 94 is oriented vertically upward.

The reservoir-facing side 72 of housing 18, from which the pump inlet 94 extends, is oriented vertically downward with the power tool appliance 12 in the suction feed state. The reservoir 16*a* extends outward and vertically downward from the pump inlet 94 with power tool appliance 12 in the suction feed state. The reservoir 16*a* depends from the connector 64 with the power tool appliance 12 in the suction feed state. In the example shown, the reservoir 16*a* hangs from and is supported by pump body 90, which forms connector 64, with power tool appliance 12 in the suction feed state.

The reservoir-facing side 72 of housing 18, from which the pump inlet 94 extends, is oriented vertically upward with the power tool appliance 12 in the gravity feed state. The reservoir 16*b* extends outward and vertically upward from the pump inlet 94 with power tool appliance 12 in the gravity feed state. The reservoir 16*b* is supported on the connector 64 with the power tool appliance 12 in the gravity feed state. In the example shown, the reservoir 16*a* rests on and is supported by pump body 90, which forms connector 64, with power tool appliance 12 in the gravity feed state.

While power tool appliance 12 is shown as including a single pump inlet 94 that is repositionable between being oriented vertically upward and vertically downward, it is understood that not all examples are so limited. For example, power tool appliance 12 can include multiple pump inlets 94 such that the user can select whether to attach a reservoir 16*a* to one inlet for suction feed or reservoir 16*b* to another inlet for gravity feed. The power tool appliance 12 can include a selector for selectively connecting the multiple inlets to the spray valve 62 and then spray outlet 38.

The arm 26 and housing 18 are repositionable relative to each other such that pump inlet 94 can be oriented vertically upwards or downwards. The repositioning facilitates reconfiguration of the power tool appliance 12 between the suction feed and gravity feed states. In the example shown, the arm 26 and/or housing 18 can be pivoted relative to the other one of the arm 26 and/or housing 18 such that housing 18 is oriented with the pump inlet 94 vertically upward or vertically downward.

In the example shown, arm 26 includes arm side 130*a* that is oriented longitudinally towards the power tool 14 with the power tool appliance 12 in the suction feed state and includes arm side 130*b* that is oriented longitudinally away from power tool 14 with the power tool appliance 12 in the suction feed state. The arm side 130*a* is oriented longitudinally away from the power tool 14 with the power tool appliance 12 in the gravity feed state and the arm side 130*b* is oriented longitudinally towards from power tool 14 with the power tool appliance 12 in the gravity feed state.

The arm 26 is disposed longitudinally between the pump inlet 94 and the trigger 36 of the power tool 14. The arm 26 is disposed directly longitudinally between reservoir 16*a* and handle 30 with the power tool appliance 12 in the suction feed state. The arm 26 is disposed longitudinally between the reservoir 16*b* and the handle 30 with the power tool appliance 12 in the gravity feed state. The arm 26 can directly longitudinally overlap with the handle 30 and/or trigger 36 with the power tool appliance 12 in the gravity feed state. The support assembly 22 can thereby provide a trigger guard that can prevent inadvertent triggering of the power tool 14 by extending around an area within which the trigger 36 is disposed with power tool appliance 12 in either of the suction or gravity feed states.

Mount 28 includes interface sides 132*a*, 132*b*. Interface sides 132*a*, 132*b* are configured to interface with power tool 14 to support the power tool 14 on power tool appliance 12. In some examples, the interface side 132*a*, 132*b* not interfacing with power tool 14 can rest on a support surface, such as the floor or a table, to support the tool system 10 on that support surface. The interface sides 132*a*, 132*b* of the mount 28 are formed as opposite sides of the mount 28. The slots 44 are disposed vertically between the interface sides 132*a*, 132*b* with the mount 28 disposed to support the power tool 14. The ribs 46 extend between interface sides 132*a*, 132*b* to support interface sides 132*a*, 132*b*.

With power tool appliance 12 in the suction feed configuration, the interface side 132*a* is oriented face up. The interface side 132*a* is oriented upwards such that the base of the power tool 14 can rest on interface side 132*a*. With the power tool appliance 12 in the gravity feed configuration, the interface side 132*b* is oriented face up. The interface side 132*b* is oriented upwards such that the base of the power tool 14 can rest on interface side 132*b*. The inverting or flipping of the power tool appliance 12 changes which surface of the mount 28 supports the power tool 14. In this way, the housing 18 is flipped such that the pump inlet 94 faces upward instead of downward. Likewise, the mount 28 is flipped such that a different surface supports the power tool 14 and the other surface can engage a resting surface when the system is set down.

The inversion of the power tool appliance 12 changes the orientation of the pump inlet 94. With the power tool appliance 12 in the suction feed state, the pump inlet 94 is orientated to face downward for a suction mode in which the fluid is sucked up from the reservoir 16*a*. In the gravity feed state, the pump inlet 94 faces upwards to receive the fluid via gravity feed, although the pump 58 within the housing 18 can still provide some amount of suction to move the paint through the pump inlet 94. The flipping of the orientation of the inlet 94 can be advantageous because different types of fluid reservoirs and fluids operate better or worse in gravity or suction feed, and the flipping of the housing 18 allows the orientation of the pump inlet 94 to be changed based on the best type of feed for the application.

As shown in FIG. 7B, a different type of reservoir 16*b* can be connected to the power tool appliance 12 at the connector 64. Reservoir 16*b* is configured for gravity feed. The body of reservoir 16*b* narrows towards pump inlet 94 to funnel the spray fluid towards pump inlet 94. As such, a different type of fluid reservoir 16*b* can be attached to feed fluid to the power tool appliance 12 via the pump inlet 94.

In the example shown, the connector 64 includes a plurality of tabs 136 that are configured to interface with corresponding slots on a reservoir 16*a*, 16*b* to connect the reservoir 16*a*, 16*b* to the power tool appliance 12. The tabs 136 can be evenly arrayed about the pump body 90. Multiple different configurations of reservoir can be mounted to power tool appliance 12 at connector 64. As such, power tool appliance 12 allows the user to connect the variation of reservoir that works best for the spray operations being conducted.

As such, different suction or gravity feed options are possible based on inversion of the power tool appliance 12. Rotation of the housing 18 and the mount 28 relative to the arm 26 via the arm pivot 48 and mount pivot 50 facilitate such inversion in the example shown. In the example shown, the arm 26 is configured to pivot relative to the housing 18 on a first pivot axis and the mount 28 is configured to pivot relative to the arm 26 on a second pivot axis. In the example shown, the first and second pivot axes are parallel to each other, which facilitates quick and easy reconfiguration between the suction and gravity feed states.

During flipping of power tool appliance 12, the rear side 70 moves within the arm yoke 108 and between the branches 134 of the arm yoke 108. The arm mount 118, and in some examples housing 18, move within arm yoke 108 and directly between branches 134. The input shaft 52 that extends out of the rear side 70 passes through the gap between the branches 134 of the arm yoke 108. In the example shown, the power tool appliance 12 is configured such that the pump inlet 94 does not pass through the arm yoke 108 or between the branches 134. The power tool appliance 12 is configured such that the reservoir-facing side 72 and front side 68 do not pass through the arm yoke 108 or between the branches 134. Arm yoke 108 can be considered to form a U-joint in the example shown. The housing 18 is connected to the arm 26 such that input shaft 52 that extends rearward relative to rear side 70 of the housing 18 moves through the arm yoke 108 during reconfiguration between the suction feed state and the gravity feed state.

During flipping, the mount 28 moves within the mount yoke 110. While mount yoke 110 is shown as formed by arm 26 in the example shown, it is understood that not all examples are so limited. For example, mount yoke 110 can be formed by mount 28 and can extend about or within a portion of arm 26. Mount yoke 110 can be considered to form a U-joint in the example shown.

During flipping, the housing 18 and mount 28 can be rotated in the same rotational direction relative to arm 26 to reconfigure the power tool appliance 12. The housing 18 and mount 28 can be rotated in rotational direction RD2 to reconfigure power tool appliance 12 from the suction feed state to the gravity feed state. The housing 18 and mount 28 can be rotated in rotational direction RD1 to reconfigure power tool appliance 12 from the gravity feed state to the suction feed state.

Power tool appliance 12 provides significant advantages. Power tool appliance 12 can be reconfigured between various states based on the operating requirements of the user. In the example shown, the power tool appliance 12 can be reconfigured between the suction and gravity feed states as desired for spray operations. The pump inlet 94 can be reoriented between receiving fluid that is flowing downward and receiving fluid that is flowing upward. In various other examples, the power tool appliance 12 can include other structure or features that are disposed at or near the location of pump inlet 94. For example, a handle can project from the reservoir-facing side 72 of housing 18 and the user may desired to grip the power tool appliance 12 on the lower or upper side of power tool appliance 12.

Figure 8:
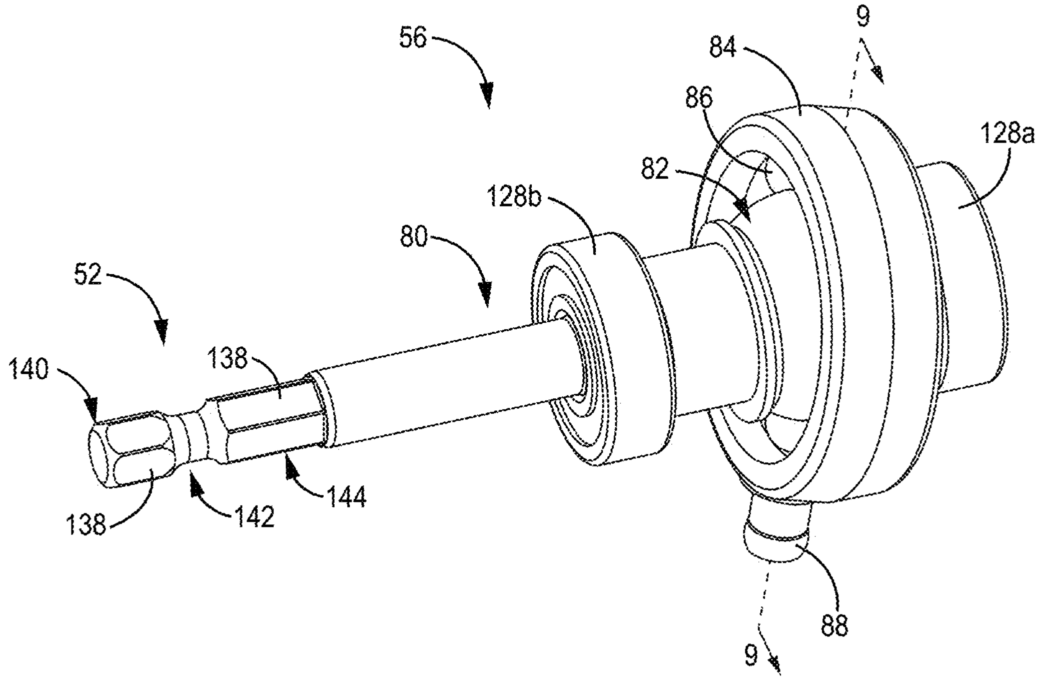
FIG. 8 is an isometric view of a drive.
Figure 9:
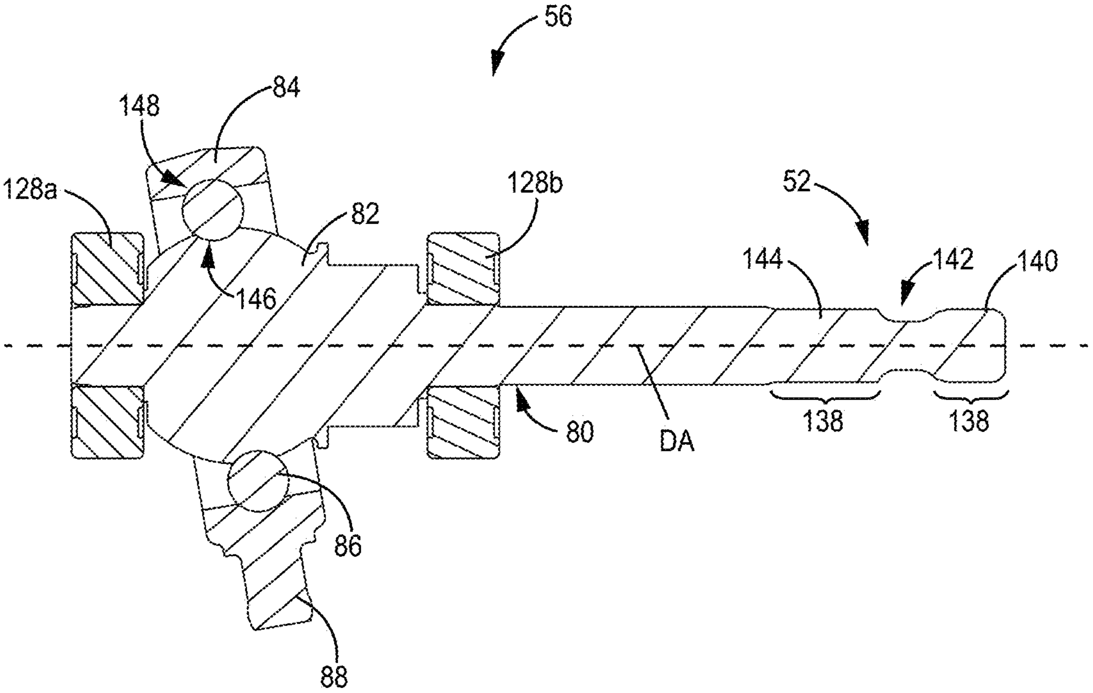
FIG. 9 is a cross-sectional view taken along line 9-9 in FIG. 8.

FIG. 8 is an isometric view of drive 56. FIG. 9 is a cross-sectional view taken along line 9-9 in FIG. 8. FIGS. 8 and 9 are discussed together. Driveshaft 80, input shaft 52, drive body 82, balls 86, outer ring 84, output 88, bushing **128*a*, and bushing 128*b*** are shown.

Drive 56 is configured to receive a rotational input via input shaft 52 and to output a linear reciprocating motion via output 88. The drive 56 can receive a continuous rotational input in either rotational direction on the drive axis DA and will provide the reciprocating motion via output 88. While drive 56 is shown as including a single output 88, it is understood that drive 56 can include multiple outputs 88 such that drive 56 can cause reciprocation of multiple fluid displacers, such as pistons or diaphragms. The multiple outputs 88 can be arrayed about the drive axis DA. The multiple outputs 88 can be evenly arrayed about the drive axis DA.

Input shaft 52 is configured to interface with the power tool 14 to receive the rotational motion from the power tool 14. Input shaft 52 includes keyed exterior 138 that is configured to interface with the power tool 14. The keyed exterior 138 facilitates transmission of the rotational motion from the power tool 14 to the drive 56.

In the example shown, the input shaft 52 includes head 140, shaft groove 142, and shaft body 144. The input shaft 52 is elongated along drive axis DA. Shaft body 144 extends axially from driveshaft 80.

Shaft groove 142 is disposed axially between shaft body 144 and head 140. Shaft groove 142 can extend between and connect shaft body 144 and head 140. Shaft groove 142 can receive a detent; such as a ball, shaft, etc.; of the power tool 14 that axially locates the input shaft 52 relative to the power tool 14. It is understood that not all examples include shaft groove 142.

Head 140 is disposed at a distal, free end of the input shaft 52. In the example shown, the keyed exterior 138 is formed on both the shaft body 144 and the head 140, though it is understood that not all examples are so limited.

Drive body 82 is a radially enlarged portion of driveshaft 80. Drive body 82 is disposed axially between bushings **128*a*, 128*b*. Drive body 82 can be captured axially between bushings 128*a*, 128*b* to prevent driveshaft 80** from displacing axially along drive axis DA.

Outer ring 84 is disposed about drive body 82. Outer ring 84 is prevented from rotating about the drive axis DA with driveshaft 80. Instead, rotation of the driveshaft 80 causes the outer ring 84 to wobble such that output 88 reciprocates linearly.

Inner groove 146 is formed on drive body 82. Inner groove 146 is canted relative to a plane orthogonal to the drive axis DA. Inner groove 146 extends transverse to a plane orthogonal to the drive axis DA. The inner groove 146 can extend fully annularly about the drive axis DA. Outer groove 148 is formed on outer ring 84. Outer groove 148 can be disposed coaxially with structure of outer ring 84.

Balls 86 are disposed between drive body 82 and outer ring 84. Balls 86 are disposed in inner groove 146 and outer groove 148. Rotation of the drive body 82 can displace the balls 86 axially forward and rearward due to rotation of the inner groove 146, thereby causing the outer ring 84 to wobble such that outputs 88 move forward and rearward. The drive body 82 can be considered to form an inner race while the outer ring 84 forms an outer race of a bearing that provides the linear input to the fluid displacer of the pump 58.

Bushings **128*a*, 128*b* are configured to rotationally support the drive 56. The bushings 128*a*, 128*b* can support the drive 56 on the housing 18. While bushings 128*a*, 128*b* are shown, it is understood that drive 56 can be supported in any desired manner on housing 18. For example, bushings 128*a*, 128*b*** can be formed as roller bearings or other structure configured to support relative rotational motion.

Bushing **128*b* is disposed axially between drive body 82 and input shaft 52. Bushing 128*b* is disposed axially between the bearing interface between outer ring 84 and drive body 82 and the input shaft 52. Bushing 128*b* is disposed axially between output 88 and input shaft 52. The input shaft 52 is cantilevered relative to bushing 128*b*. The output 88 is disposed axially between bushings 128*a*, 128*b*. The output 88** being disposed axially between bushings 128*a*, 128*b* can balance loads transmitted to output 88 and thus to pump 58 to prevent side-loading of the piston 92 of the pump 58.

In the example shown, input shaft 52 is formed as a unitary part of driveshaft 80. Monolithic structure forms both the inner race of the bearing (e.g., the drive body 82 forming inner groove 146) and the keyed exterior 138 of the input shaft 52. The drive body 82 and input shaft 52 can be formed from the same piece of metal (e.g., steel) in the example shown. Drive 56 can be configured such that a contiguous metallic piece receives the rotation from the power tool 14 and exerts force that transmits the rotation (e.g., by inner groove 146 interfacing with balls 86) to the linear reciprocating component of the drive 56.

The material that forms the input shaft 52 can be contiguous with material that forms at least part of an eccentric of the drive 56. In the example shown, the drive body 82 can be considered to form the eccentric of the drive 56. In the example shown, the drive shaft 80 is not symmetric about its axis DA on which the bearing is mounted (i.e. it is radially thicker in some areas and radially thinner elsewhere). The input shaft 52 in the example shown is contiguous with the radially thicker and thinner portions of the drive shaft 80. The input shaft 52 is contiguous with the portion of drive shaft 80 forming the inner race of the bearing, in the example shown.

Drive 56 provides significant advantages. The input shaft 52 being monolithically formed with other rotational input components of drive 56 provides for a stronger and more rigid input to drive 56. Such a configuration provides for increased life and thereby decreases costs. Drive 56 is configured to directly interface with the power tool 14 to receive the input from the power tool 14, which provides for a relatively simple and easy to use configuration. Keyed exterior 138 facilitates transmission of rotational motion from a standard power tool (e.g., drill or impact driver) to the power tool appliance 12. The keyed exterior 138 can be received by the power tool 14 and can receive torque while preventing relative rotation to provide the rotational output from the power tool 14 to the drive body 82.

Figure 10A:
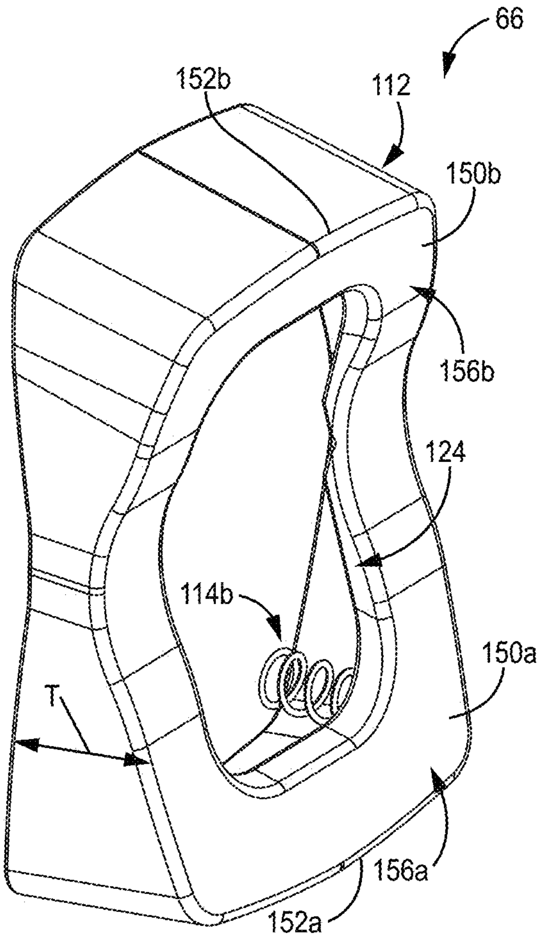
FIG. 10A is a first isometric view of a shaft aligner.
Figure 10B:
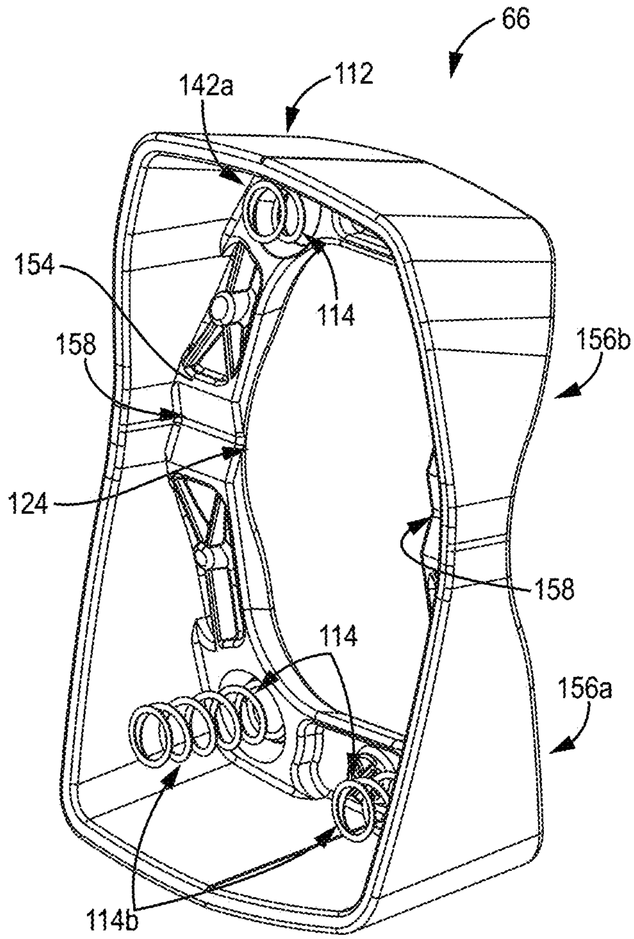
FIG. 10B is a second isometric view of the shaft aligner.

FIG. 10A is a first isometric view of shaft aligner 66. FIG. 10B is a second isometric view of shaft aligner 66. FIGS. 10A and 10B are discussed together. In the example shown, shaft aligner 66 includes strut 112 and springs 114. Springs 114 are shown connected to strut 112. In the example shown, the strut 112 interfaces with upper springs 114*a* and lower springs 114*b*.

The strut 112 interfaces with a plurality of springs 114 which are configured to push and/or pull on the strut 112. The strut 112 includes face 150*a* and face 150*b*. Face 150*a* is configured to engage with arm side 130*a* of arm 26, such as with power tool appliance 12 in the suction feed configuration. Face 150*b* is configured to engage with arm side 130*b* of arm 26, such as with power tool appliance 12 in the gravity feed configuration. As previously mentioned, the strut 112 may only include one of the faces 150*a*, 150*b* and may not include the other one of faces 150*a*, 150*b*, particularly in examples in which the power tool appliance 12 is not reconfigurable to flip between states.

Face 150*a* is sloped such that a thickness T of the strut 112 increases between a central portion of the strut 112 and edge 152*a* of the strut 112. Similarly, face 150*b* is sloped such that the thickness T of the strut 112 increases between the central portion of the strut 112 and edge 152*b* of the strut 112. The sloped configurations of the faces 150*a*, 150*b* orient the faces 150*a*, 150*b* vertically upward when the face 150*a*, 150*b* interfaces with the arm 26. Such a configuration provides the upward force compensation that facilitates alignment between the power tool 14 and input shaft 52.

Springs 114 are disposed on an inner side 154 of strut 112. Springs 114 can be connected to strut 112 such that springs 114 can exert pulling in addition to pushing forces on the strut 112. In the example shown, upper springs 114*a* interface with strut portion 156*a* and lower springs 114*b* interface with strut portion 156*b*. Face 150*a* is formed on an outer side of strut portion 156*a*. Face 150*b* is formed on an outer side of strut portion 156*b*. As discussed above, upper springs 114*a* and lower springs 114*b* are configured to interface between housing 18 and strut 112 to bias strut 112, and thus arm 26 and power tool 14, to provide an upward force compensation that accounts for the weight of power tool appliance 12.

The shaft aligner 66 including springs 114 provides significant advantages. The springs 114 are configured to balance the power tool appliance 12 relative to the power tool 14 to maintain concentricity therebetween. The springs 114 provide a variable force compensation that accounts for the changing weight of the power tool appliance 12 as spray fluid is emitted during operation. As the weight of the power tool appliance 12 drops, the force required to be exerted by springs 114 also drops, which allows springs 114 to expand while still compensating for the weight of power tool appliance 12.

Aperture 124 is formed through strut 112 in the example shown. In this embodiment, the strut 112 is a ring-like structure which defines aperture 124. In such a structure, the rotational input shaft 52 can extend through the aperture 124 in the strut 112. Furthermore, a part of the housing 18 (e.g., arm mount 118) can extend through the aperture 124. Aperture 124 facilitates positioning the strut pivot 116 longitudinally between the arm pivot 48 and the center of gravity (which can be aligned on reservoir 16*a*, 16*b*) of the power tool appliance 12. Such a configuration facilitates the shaft aligner 66 compensating for the weight of power tool appliance 12 to align power tool appliance 12 with power tool 14.

In the example shown, rocker 158 is formed on the back side of strut 112. The strut 112 is configured to rock about rocker 158 to push rearward either the face 150*a* or face 150*b*, with the plurality of springs 114 applying opposing forces on opposite sides of the rocker 158, which balances the strut 112 and thereby the arm 26 to facilitate loading of the rotational input shaft 52 to avoid entry into impact function. It is noted while a single strut 112 is shown, two different pivoting structures can instead be employed, respectively defining face 150*a* and face 150*b*. Also, a single pivoting structure including only a single face 150*a*, 150*b* may be included, particularly in embodiments in which the housing 18 does not invert for alternative suction and gravity feeds. Strut 112 can engage the arm 26 from the either side of the arm 26 and can always rotate upwards to swing the arm 26 upwards regardless of whether the housing 18 is orientated for suction or gravity feed.

In some examples, strut 112 may not be directly connected to housing 18. For example, the arm 26 can interface with strut 112 to engage the rocker 158 on projections of the housing 18. The arm 26 can prevent the strut 112 from moving off of the housing 18. In some examples, the springs 114 are not connected to housing 18. In such an example, the shaft aligner 66 can be a single assembly, such as formed by the strut 112 and springs 114, that is not directly connected to, but is held on, the housing 18.

Figure 11A:
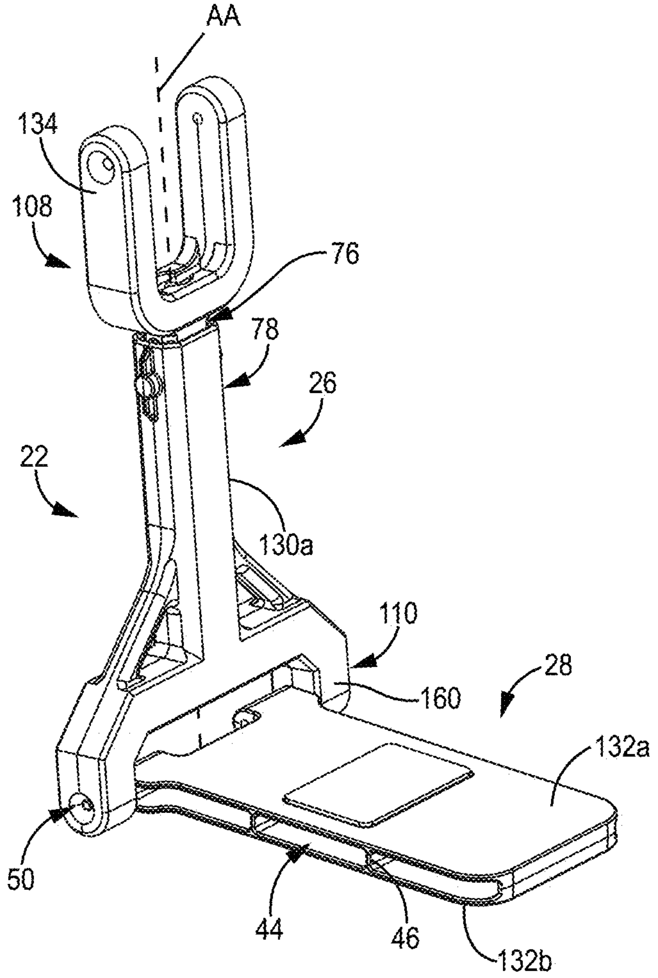
FIG. 11A is an isometric view of a support assembly of the power tool attachment in a contracted state.
Figure 11B:
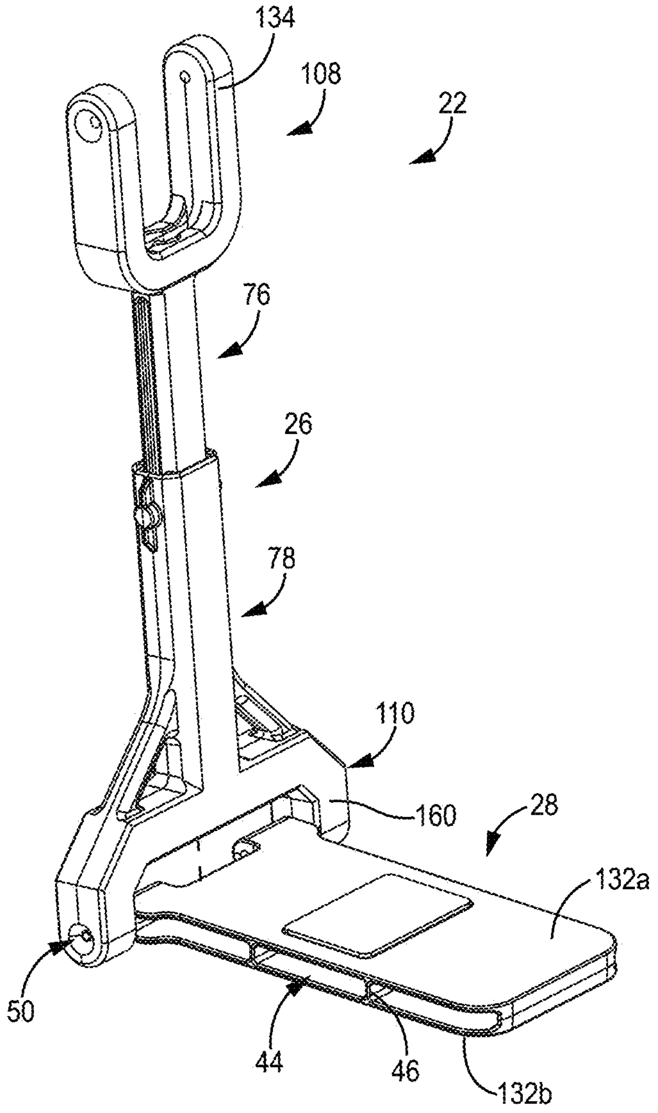
FIG. 11B is an isometric view of the support assembly in an extended state.

FIG. 11A is an isometric view of support assembly 22 in a contracted state. FIG. 11B is an isometric view of support assembly 22 in an extended state. FIGS. 11A and 11B are discussed together. Arm 26 and mount 28 of support assembly 22 are shown. Upper arm extension 76, lower arm extension 78, arm yoke 108, and mount yoke 110 of arm 26 are shown. Slots 44, ribs 46, and interface sides 132*a*, 132*b* of mount 28 are shown.

Arm 26 is repositionable between various lengths to facilitate connection of different power tools 14 having different sizes and/or configurations to power tool appliance 12. Upper arm extension 76 and lower arm extension 78 are relatively movable along an arm axis AA to vary the length of arm 26. In the example shown, upper arm extension 76 and lower arm extension 78 are telescopically arranged, though it is understood that not all configurations are so limited. The upper arm extension 76 and lower arm extension 78 can be keyed together, such as by having non-circular cross-sections orthogonal to arm axis AA, to prevent relative rotation between the arm extensions 76, 78. In the example shown, the upper arm extension 76 extends into the lower arm extension 78 such that an amount of the upper arm extension 76 disposed outside of the lower arm extension 78 varies as the length of arm 26 varies. In various other examples, the lower arm extension 78 can extend within the upper arm extension 76, among other non-telescoping options.

Upper arm extension 76 is configured to mount the arm 26 to housing 18. In some examples, upper arm extension 76 can connect directly to housing 18. In the example shown, the upper arm extension 76 is configured to mount to housing 18 by the arm yoke 108. The branches 134 of the arm yoke 108 are configured to wrap around opposite lateral sides of an arm mount 118, which can be formed by part of the housing 18, to connect to the arm mount 118 and thus to the housing 18. In the example shown, the arm yoke 108 connects to the arm mount 118 by a pivot, such as a pin or other structure that allows relative rotation.

Mount 28 is connected to lower arm extension 78. In some examples, the mount 28 can be connected directly to lower arm extension 78. In the example shown, the mount 28 is configured to connect to lower arm extension 78 by the mount yoke 110. The mount yoke 110 extends from lower arm extension 78. The mount yoke 110 is formed as a portion of the lower arm extension 78 in the example shown. The mount 28 extends within the mount yoke 110. The branches 160 of the mount yoke 110 are configured to wrap around opposite lateral sides of mount 28. In the example shown, the mount yoke 110 connects to the mount 28 by at mount pivot 50, such as a pin or other structure that allows relative rotation.

Mount 28 includes interface sides 132*a*, 132*b*. As discussed above, mount 28 can be flipped such that either interface side 132*a*, 132*b* is oriented vertically upward to support the power tool 14 while the other interface side 132*a*, 132*b* can be oriented vertically downward such as to support the power tool appliance 12 on a surface. Slots 44 extend laterally through the mount 28. Ribs 46 are disposed between the slots 44. Slots 44 provide one or more locations for the fixation 24 to pass through mount 28 to wrap around mount 28 and the base of the power tool 14 to statically fix the power tool 14 to the power tool appliance 12. In the example shown, the mount 28 includes ribs 46 at the longitudinal ends of the mount 28 such that each slot 44 is closed vertically in both vertical directions and longitudinally in both longitudinal directions. The ribs 46 can be laterally elongate.

Figure 12:
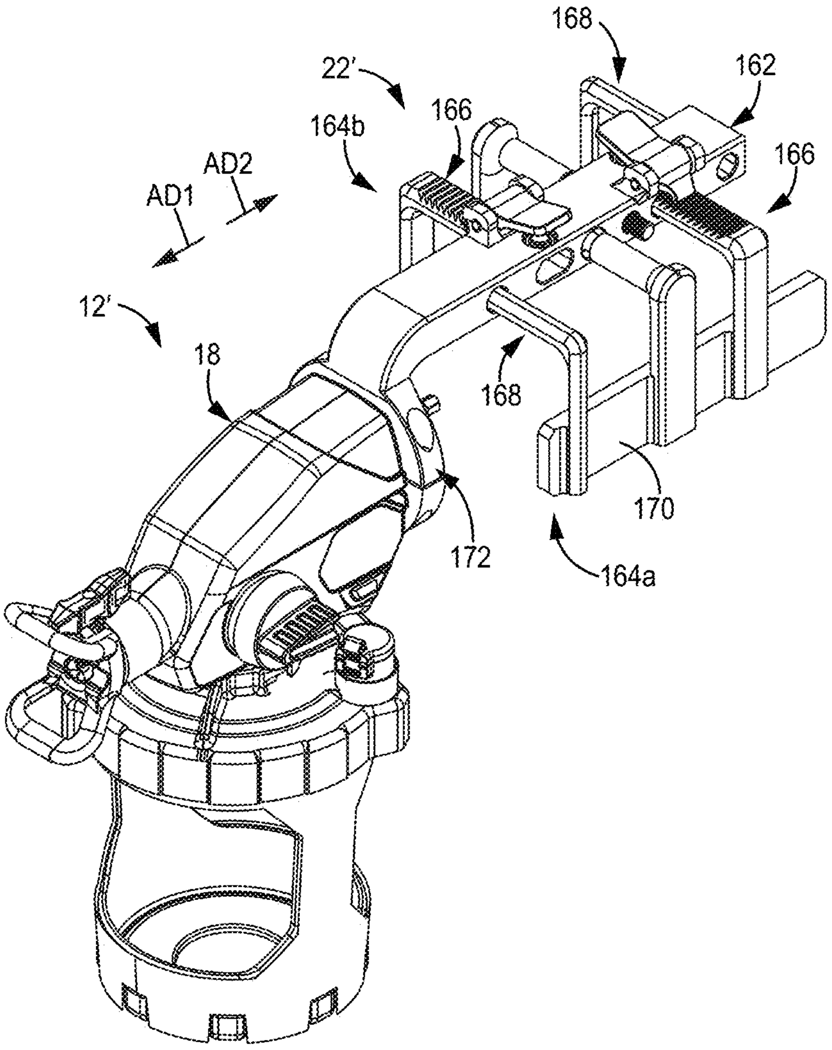
FIG. 12 is an isometric view of a power tool appliance with an alternative support assembly.

FIG. 12 is an isometric view of power tool appliance 12'. Power tool appliance 12' is substantially similar to power tool appliance 12 (best seen in FIGS. 2A, 2B, 3, 4A, 4B and 5), except that power tool appliance 12' includes support assembly 22' instead of support assembly 22. Same components between power tool appliance 12' and power tool appliance 12 include the same reference numbers and it is understood that components of power tool appliance 12' and power tool appliance 12 can be the same unless explicitly described as otherwise.

Support assembly 22' extends in the rearward axial direction AD2 from the rear side 70 of housing 18. Support assembly 22' is configured to interface with the power tool 14 to statically connect the power tool 14 to the power tool appliance 12'. In the example shown, the support assembly 22' includes support arm 162 and brackets 164*a*, 164*b*.

Support arm 162 extends longitudinally rearward from housing 18. Support arm 162 is connected to housing 18 by mount ring 172, which can extend fully or partially about housing 18 and can, in some examples, clamp onto housing 18. Support arm 162 is configured to extend over the power tool 14. Brackets 164*a*, 164*b* are connected to support arm 162. Each bracket 164*a*, 164*b* includes retainer 166, locators 168, and brace 170. The braces 170 hang below the support arm 162. The support assembly 22' is configured to receive a body of the power tool 14 between the brackets 164*a*, 164*b*. Specifically, the body of the power tool 14 is configured to be positioned between braces 170 of the brackets 164*a*, 164*b*. Locators 168 extend from the brace 170 and into the support arm 162 to locate the bracket 164*a*, 164*b* on the support arm 162. The retainers 166 are configured to allow the brackets 164 to shift laterally inwards towards each other to clamp the body of the power tool 14 while preventing the brackets 164 from shifting laterally outward unless the retainer 166 is unlocked. In the example shown, the retainers 166 are formed as ratchet straps. The retainers can be unlocked and the brackets 164 slid laterally outward to break the static interface and allow dismounting of the power tool 14.

Figure 13:
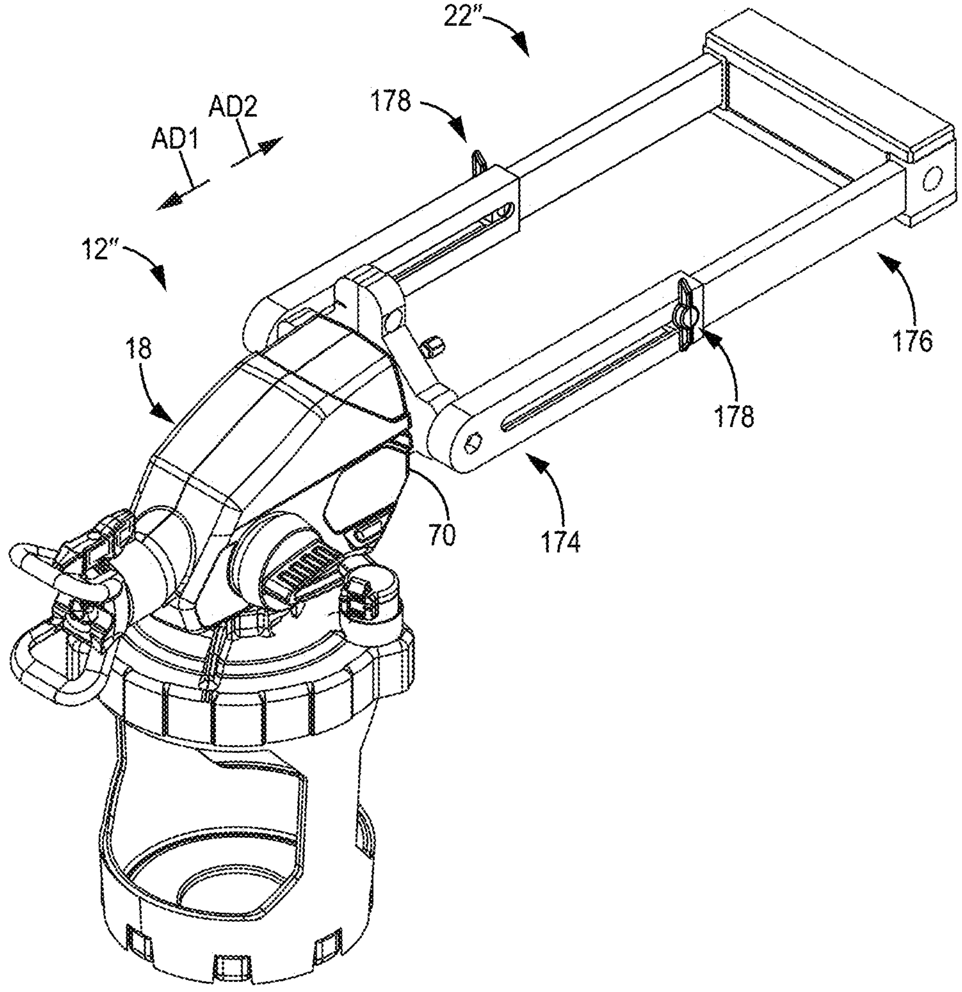
FIG. 13 is an isometric view of a power tool appliance with an alternative support assembly.

FIG. 13 is an isometric view of power tool appliance 12". Power tool appliance 12" is substantially similar to power tool appliance 12 (best seen in FIGS. 2A, 2B, 3, 4A, 4B and 5) and power tool appliance 12' (FIG. 12), except that power tool appliance 12" includes support assembly 22" instead of support assembly 22 or support assembly 22'. Same components between power tool appliance 12" and power tool appliance 12 include the same reference numbers and it is understood that components of power tool appliance 12" and power tool appliance 12 can be the same unless explicitly described as otherwise.

Support assembly 22" extends in the rearward axial direction AD2 from the rear side 70 of housing 18. Support assembly 22" is configured to interface with the power tool 14 to statically connect the power tool 14 to the power tool appliance 12". In the example shown, the support assembly 22" includes inner bracket 174 and outer bracket 176. The inner bracket 174 and outer bracket 176 can be considered to form a mount 28' of the support assembly 22".

Support assembly 22" extends longitudinally rearward from housing 18. Support assembly 22" is configured to receive power tool 14 within the space defined by the inner bracket 174 and outer bracket 176. The inner bracket 174 is connected to housing 18. The outer bracket 176 is connected to and supported by inner bracket 174. The inner bracket 174 and outer bracket 176 and configured to longitudinally clamp the power tool 14 on the power tool appliance 12". The outer bracket 176 can be moved in forward axial direction AD1 to exert the clamping force. Fasteners 178 can be fixed to maintain the clamping force and secure the power tool 14 to the power tool appliance 12". In the example shown, the outer bracket 176 and inner bracket 174 are telescopically arranged, with the outer bracket 176 received within the inner bracket 174, though it is understood that not all examples are so limited.

Figure 14:
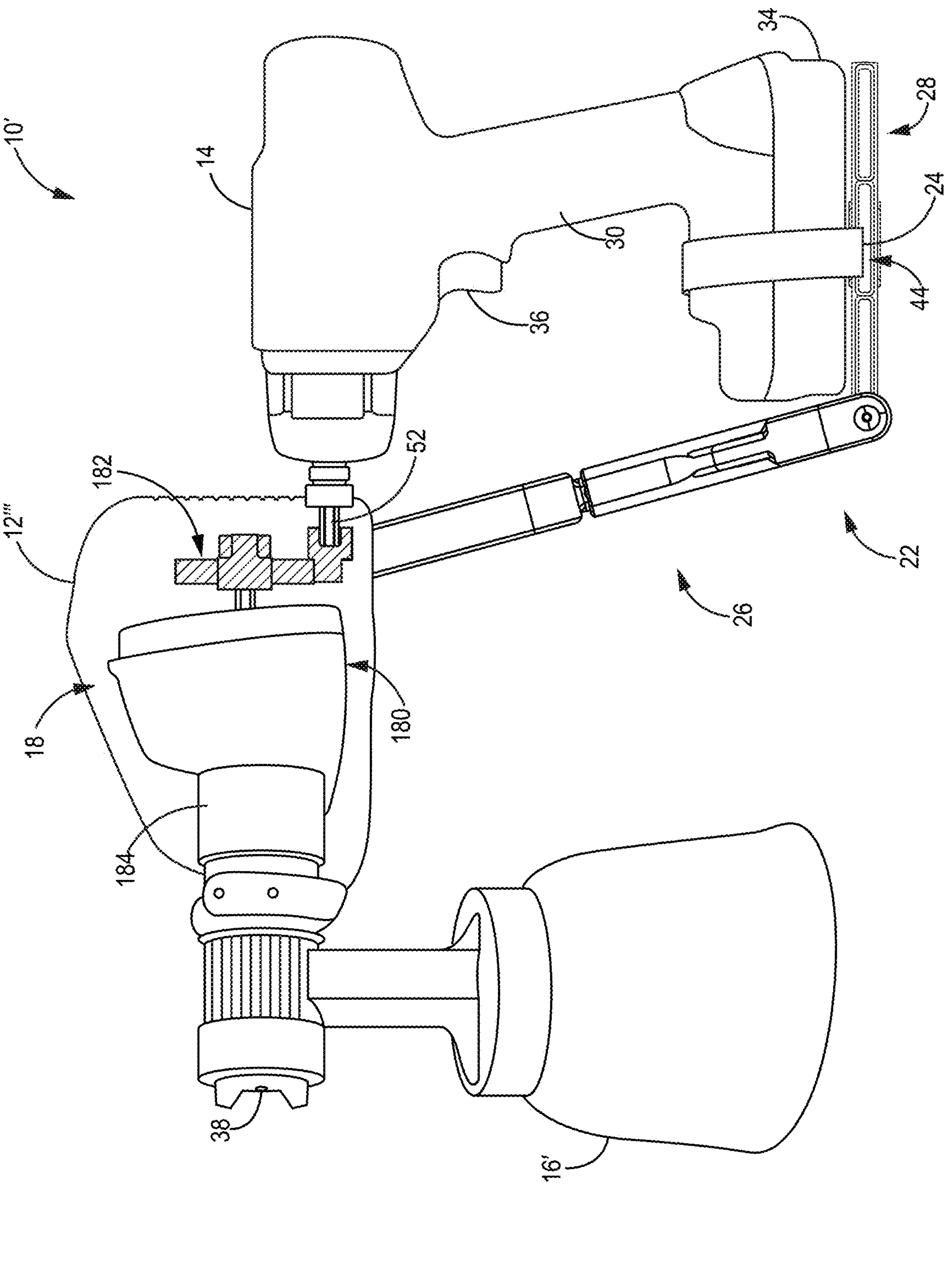
FIG. 14 is a partially schematic side view of a tool system.

FIG. 14 is a diagram illustrating a tool system 10' including power tool appliance 12'''. Power tool appliance 12''' is substantially similar to power tool appliance 12 (best seen in FIGS. 2A, 2B, 3, 4A and 4B), power tool appliance 12' (FIG. 12), and power tool appliance 12" (FIG. 13), except that power tool appliance 12''' does not include a piston. Power tool appliance 12''' is configured as a high volume, low pressure (HVLP) sprayer which uses the flow of air from turbine 180 to atomize and spray paint and other coatings. The drive 56' includes an overdrive gear set 182 which increases the rotational speed from the input via the input shaft 52 to a higher RPM which is delivered to the turbine 180. In the example shown, the drive 56' does not convert rotational motion to linear reciprocation motion. Instead, the drive 56' transmits and increases the speed of the rotational motion output from the power tool 14 to rotatably drive the turbine 180. For example, the overdrive gear set 182 can increase the rotational speed of the turbine up to 30 k rpm, among other options.

The airflow from the turbine 180 is routed through narrowing duct 184. Such airflow can be partially routed to reservoir 16' to force up fluid and/or the speed of the air can suck up fluid from the reservoir 16'. In either case, the fluid is atomized by the air and exits the spray outlet 38 as a spray fan. It is understood that, in some examples, power tool appliance 12" can be reconfigured between suction and gravity feed states.

Discussion of Non-Exclusive Examples

The following are non-exclusive descriptions of possible examples according to various aspects of the disclosure.

A power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; and a mount connected to the housing, the mount configured to interface with the power tool to statically connect the power tool to the housing.

The power tool appliance of the preceding paragraph can optionally include, additionally and/or alternatively, any one or more of the following features, configurations and/or additional components:

A shaft aligner connected to the housing, the shaft aligner configured to exert a biasing force between the housing and the power tool.

The shaft aligner includes at least one spring.

The shaft aligner is configured to bias the housing away from the mount.

A support assembly connected to the housing, the support assembly including the mount; wherein the shaft aligner interfaces with the support assembly.

The support assembly further comprises an arm, the arm extending between and connecting the housing and the mount.

The arm is pivotable relative to the housing.

The mount is pivotable relative to the arm.

The arm includes an arm spring configured to tension the arm and the arm spring configured to bias the arm into a contracted state.

The arm includes an upper arm and a lower arm, the upper arm connected to the housing and the lower arm connected to the mount.

The lower arm is movable relative to the upper arm to move the arm between the contracted state and an elongated state.

The shaft aligner is configured to exert the biasing force rearward relative to the housing.

The shaft aligner is configured to exert the biasing force vertically upward relative to the housing.

The shaft aligner is configured to exert the biasing force rearward relative to the housing and vertically upward relative to the housing.

The shaft aligner includes: a strut; and a spring configured to bias the strut outward from the housing.

The shaft aligner further comprises a second spring configured to bias the strut outward from the housing.

The spring is configured to urge the strut in opposition to the second spring.

The strut is configured to pivot relative to the housing.

The strut comprises an upper face and a lower face, the strut rocking to alternately extend or withdraw the upper face and the lower face.

A support assembly connected to the housing, the support assembly including the mount; wherein the strut interfaces with the support assembly.

The support assembly further comprises an arm, the arm extending between and connecting the housing and the mount, wherein the strut is configured to interface with the arm to orientate the arm.

A fixation configured to selectively attach a base of the power tool to the mount.

The fixation is formed as a strap.

The strap includes hook and loop fasteners.

The strap extends through a slot in the mount.

The slot is longitudinally bracketed by a first rib and a second ribs.

The slot is disposed vertically between a first side of the mount and a second side of the mount such that the slot is closed vertically towards the power tool and away from the power tool.

The slot is a first slot of a plurality of slots through the mount.

Each slot of the plurality of slots is open laterally through the mount.

The mount is formed as a plate.

The plate comprises a first mounting surface and a second mounting surface located on an opposite side of the plate with respect to the first mounting surface.

The plate is configured to flip to support the power tool on alternatively the first mounting surface and the second mounting surface.

The fixation includes double-sided hook-and-loop fasteners such that the fixation is configured to remain within the slot during flipping of the power tool and is configured to attach the power tool on either of the first mounting surface and the second mounting surface.

An arm extending from the housing, the arm connecting the mount to the housing.

The arm is pivotable relative to the housing.

The mount is pivotable relative to the arm.

The arm is extendable between a contracted state and an extended state to change a length of the arm.

An arm spring configured to bias the arm towards the contracted state.

An input shaft that extends outward from the housing, the input shaft including a hexagonal exterior contour, the input shaft configured to be received within the power tool and to transmit rotational motion from the power tool to the drive.

The input shaft is part of a single piece of metal which also converts, at least in part, rotational motion to reciprocating motion to drive an output of the power tool appliance.

The drive is a wobble drive including a drive body configured to rotate and a wobble plate including a drive projection, the drive projection configured to reciprocate due to rotation of the drive body; and the input shaft extends from the drive body and is disposed coaxially with an axis of rotation of the drive body.

The input shaft is formed monolithically with the drive body.

The drive includes a plurality of balls disposed between the drive body and the wobble plate.

The drive projection is connected to a pump supported by the housing to cause pumping by the pump.

The housing is configured to be inverted to convert a pump inlet of a pump supported by the housing between a suction state in which the pump is configured to receive fluid via suction when the pump inlet is facing vertically downward and a gravity state in which the pump is configured to receive the fluid via gravity feed when the pump inlet is facing upward.

The pump inlet includes a connector, the connector configured to interface with a reservoir to connect the reservoir to the housing.

The connector is connectable to a first reservoir of a first configuration and to a second reservoir of a second configuration different from the first configuration.

An arm extending between and connecting the housing and the mount, wherein the arm is pivotable on the housing such that the pump inlet can pivot between the suction state and the gravity state.

The mount is pivotable relative to the arm such that a first mounting surface of the mount is oriented vertically upward with the pump inlet in the suction state and such that a second mounting surface of the mount is oriented vertically upward with the pump inlet in the gravity state.

A first face of the arm is oriented longitudinally away from the mount with the pump inlet in the suction state and the first face is oriented longitudinally towards the mount with the pump inlet in the gravity state.

The arm includes an upper clevis connected to the housing.

An input shaft extending out from the housing through a rear side of the housing is configured to pass through the upper clevis during repositioning between the suction state and the gravity state.

A portion of the housing is disposed within the upper clevis.

The arm includes a lower clevis, the mount connected to the arm within the lower clevis.

An arm extending between and connecting the housing and the mount, wherein the arm is extendable between a contracted state in which the arm has a first length and an extended state in which the arm has a second length greater than the first length.

The arm is positionable to have a plurality of different lengths between the first length and the second length.

The arm includes an arm tensioner configured to urge the arm towards the contracted state.

The arm tensioner is disposed within the arm.

The arm tensioner comprises a spring.

The arm comprises: an upper arm connected to the housing; and a lower arm connected to the mount, wherein the lower arm is movable along the upper arm to change a length of the arm.

The upper arm and the lower arm are telescopically arranged.

The upper arm extends within the lower arm.

The arm includes an arm tensioner configured to urge the arm towards the contracted state, wherein the arm tensioner is disposed within both of the upper arm and the lower arm.

The arm is connected to the housing at a first pivot.

The arm is connected to the mount at a second pivot.

The power tool appliance does not include any gear as part of the drive for translating the rotational motion received from the power tool.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

The drive axis is disposed parallel to the pump axis.

The pump axis is radially offset from the drive axis.

The pump axis is disposed vertically below the drive axis.

The pump axis and the drive axis are disposed co-planar on a plane that extends vertically upward and downward relative to the housing and longitudinally forward and rearward relative to the housing.

The drive includes an overdrive gear configured to receive the rotational motion from the power tool at a first speed and configured to output rotational driving motion at a second speed greater than the first speed.

A pump supported by the housing, the pump connected to the drive to receive the rotational driving motion from the drive The pump is a turbine pump.

An input shaft configured to connect to the power tool to receive the rotational output from the power tool is not disposed coaxially with the drive.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a mount connected to the housing, the mount configured to interface with the power tool to statically connect the power tool to the housing; and a shaft aligner supported on the housing, the shaft aligner configured to bias the housing vertically upwards relative to the power tool.

The power tool appliance of the preceding paragraph can optionally include, additionally and/or alternatively, any one or more of the following features, configurations and/or additional components:

The shaft aligner is configured to exert a variable biasing force.

The shaft aligner includes at least one spring.

The shaft aligner is disposed longitudinally between a center of gravity of the power tool appliance and a portion of an input shaft of the power tool appliance that projects out of a rear side of the housing, the input shaft configured to receive the rotational input from the power tool.

The shaft aligner includes a strut.

The strut is configured to rock on the housing.

The shaft aligner includes a first spring and a strut, wherein the first spring is disposed between the strut and the housing such that the first spring is configured to be compressed between the strut and the housing to bias the strut in a first rotational direction about a strut pivot.

The shaft aligner includes a second spring disposed between the strut and the housing such that the second spring is configured to be compressed between the strut and the housing to bias the strut in the first rotational direction.

The shaft aligner includes a third spring, the third spring disposed between the strut and the housing such that the third spring is configured to be compressed between the strut and the housing to bias the strut in a second rotational direction opposite the first rotational direction.

The shaft aligner includes a fourth spring disposed between the strut and the housing such that the fourth spring is configured to be compressed between the strut and the housing to bias the strut in the second rotational direction.

An arm extending between and connecting the housing and the mount, wherein the strut is disposed between the arm and the housing.

The arm is connected to the housing at on an opposite side of the strut from a front end of the housing.

The arm retains the strut on the housing.

The arm is pivotably connected to the housing.

The mount is pivotably connected to the arm.

The arm extends over a first lateral side of the housing and a second lateral side of the housing, and wherein the strut extends over the first lateral side and the second lateral side.

The arm is movable between a contracted state and an extended state to change a length of the arm.

A tensioner configured to urge the arm towards the contracted state.

The tensioner is disposed within the arm.

The arm includes an upper arm extension and a lower arm extension that are movable relative to each other.

The upper arm extension and the lower arm extension are disposed telescopically.

The upper arm extension is at least partially disposed within the lower arm extension.

A tensioner configured to urge the arm towards the contracted state, the tensioner disposed within and connected to the upper arm extension and the lower arm extension.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a support assembly connected to the housing and extending from the housing, the support assembly configured to interface with the power tool to statically connect the power tool to the housing; and a spring disposed between the housing and the support assembly, the spring configured to bias the housing upwards and away from the support assembly to align the power tool and the power tool assembly.

The power tool appliance of the preceding paragraph can optionally include, additionally and/or alternatively, any one or more of the following features, configurations and/or additional components:

The spring is disposed between the housing and a strut, spring configured to bias the housing away from the strut.

The strut is configured to engage the support assembly.

The support assembly comprises an arm, the arm connected to the housing and movable relative to the housing.

The spring is configured to bias the housing vertically upward and away from the arm.

The arm is pivotably connected to the housing.

The support assembly includes a mount connected to the housing, wherein the mount is configured to interface with the power tool to statically connect the power tool to the power tool appliance.

The spring is a first spring; and a second spring is disposed between the housing and the support assembly, the second spring configured to bias the housing upwards and away from the support assembly to align the power tool and the power tool assembly.

The first spring is configured to bias the housing in a first vertical direction and the second spring is configured to bias the housing in a second vertical direction opposite the first vertical direction.

The first spring is configured to bias the housing in a first vertical direction and the second spring is configured to bias the housing in the first vertical direction.

The spring is disposed longitudinally between the support assembly and a center of gravity of the power tool appliance.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a support assembly connected to the housing and extending from the housing, the support assembly configured to interface with the power tool to statically connect the power tool to the housing; and a first plurality of springs configured to bias the housing upwards and away from the support assembly to align the power tool and the power tool assembly.

The power tool appliance of the preceding paragraph can optionally include, additionally and/or alternatively, any one or more of the following features, configurations and/or additional components:

The first plurality of springs includes a first pair of springs.

The first plurality of springs are configured to exert a biasing force longitudinally forward and vertically in a first vertical direction.

A second plurality of springs configured to bias the housing upwards and away from the support assembly to align the power tool and the power tool assembly.

The first plurality of springs are configured to exert a biasing force longitudinally forward and vertically in a second vertical direction.

The second plurality of springs includes a second pair of springs.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a support assembly connected to the housing and extending from the housing, the support assembly configured to interface with the power tool to statically connect the power tool to the housing; a first spring configured to bias the support assembly longitudinally rearward away from the housing and vertically upwards to align the power tool and the power tool assembly; and a tensioner configured to bias a mount of the support assembly to align the power tool and the power tool assembly.

The power tool appliance of the preceding paragraph can optionally include, additionally and/or alternatively, any one or more of the following features, configurations and/or additional components:

The tensioner is configured to bias the mount longitudinally forward and vertically upwards relative to the housing.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; wherein the power tool appliance is configured to preload the power tool.

The power tool appliance of the preceding paragraph can optionally include, additionally and/or alternatively, any one or more of the following features, configurations and/or additional components:

Preloading inhibits the power tool from triggering an impact driver function.

The power tool appliance preloads the power tool through a drive shaft of the power tool appliance.

The power tool appliance preloads the power tool through the drive shaft via one or more springs of the power tool appliance indirectly orientating the power tool relative to the drive shaft.

An arm spring of the one or more springs tensions an arm connected to a mount on which the power tool is mountable.

The arm is extendable by overcoming the arm spring, and the arm spring urging the arm to be shorter.

A pivot member orientates the arm.

The pivot member is urged by at least one of the one or more springs.

The pivot member is a strut.

The strut has an upper side and a lower side, the lower side engaging the arm in a first orientation of the power tool appliance and the upper side engaging the arm in a second orientation of the power tool appliance that is inverted with respect to the first orientation.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; an arm extending from the housing, the arm configured to connect the power tool to the housing; and a strut configured to engage the arm to orient the arm relative to the housing.

The power tool appliance of the preceding paragraph can optionally include, additionally and/or alternatively, any one or more of the following features, configurations and/or additional components:

The strut is configured to pivot relative to the housing.

The strut is not directly connected to the housing.

The strut is held on the housing by the arm.

The strut is configured to pivot relative to the housing of the power tool appliance to adjust alignment of the power tool and the power tool appliance via orientation of the arm relative to the housing.

The strut comprises an upper face and a lower face, the strut rocking to alternately extend or withdraw the upper face and the lower face to orientate the arm.

One or more springs which urge the strut.

The one or more springs comprise one or more upper springs and one or more lower springs, the one or more upper springs urging in opposition to the one or more lower springs to balance the strut.

The arm is connected an arm mount to connect to the housing, wherein the arm mount projects through an aperture in the strut.

The arm mount is formed as a portion of the housing.

The arm is mounted to the arm mount at an arm pivot.

The housing includes at least one ridge, the at least one ridge configured to limit displacement of the strut.

The at least one ridge is sloped transverse to a horizontal plane.

The at least one ridge includes a first ridge configured to limit displacement of the strut in a first direction and a second ridge configured to limit displacement of the strut in a second opposite direction.

The first ridge and the second ridge are disposed as a chevron pointing longitudinally rearward.

An input shaft projects from a rear side of the housing, wherein the strut is disposed longitudinally between the input shaft and a front side of the housing.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; and an arm connected to the housing and configured to statically connect the power tool to the housing.

The power tool appliance of the preceding paragraph can optionally include, additionally and/or alternatively, any one or more of the following features, configurations and/or additional components:

The arm is movable between a contracted state and an extended state to change a length of the arm.

A tensioner configured to urge the arm to the contracted state.

The tensioner is a spring.

The tensioner is internal to the arm.

The arm includes an upper arm extension and a lower arm extension, and wherein the tensioner is connected to the upper arm extension and the lower arm extension to pull the upper arm extension and the lower arm extension together.

The upper arm extension and lower arm extension are disposed telescopically.

The upper arm extension is at least partially disposed within the lower arm extension.

The arm is movable relative to the housing.

The arm is pivotable relative to the housing.

A pump inlet of a pump supported by the housing projects from a reservoir-facing side of the housing, and wherein the housing is reorientable relative to the arm between a suction feed state, in which the pump inlet is oriented vertically downward, and a gravity feed state, in which the pump inlet is oriented vertically upward.

The arm is connected to the housing by an arm yoke.

An input shaft extends outward from a rear side of the housing, the input shaft disposed laterally between branches of the arm yoke.

The arm comprises: an upper arm extension connected to the housing; and a lower arm extension projecting form the upper arm extension and movable relative to the upper arm extension to adjust a length of the arm.

The upper arm extension includes an arm yoke connected to the housing.

The lower arm extension includes a mount yoke configured to connect to a mount that connects to the power tool.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; and an arm connected to the housing and configured to statically connect the power tool to the housing, wherein the arm is reconfigurable between a contracted state and an extended state to vary a length of the arm.

The power tool appliance of the preceding paragraph can optionally include, additionally and/or alternatively, any one or more of the following features, configurations and/or additional components:

A tensioner configured to bias the arm towards the contracted state.

The arm is movable relative to the housing such that the arm is reorientable relative to the housing.

The arm is pivotably connected to the housing.

A mount connected to the arm, the mount configured to interface with the power tool to statically connect the power tool to the housing.

The mount is pivotably connected to the arm.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; an input shaft extending out a rear end of the housing, the input shaft configured to interface with the power tool to receive the rotational input; and an arm movably connected to the housing at an arm pivot, the arm configured to statically connect the power tool to the housing.

The power tool appliance of the preceding paragraph can optionally include, additionally and/or alternatively, any one or more of the following features, configurations and/or additional components:

The arm is connected to an arm mount to connect to the housing.

The arm mount is formed as a portion of the housing.

A spring configured to bias the housing away from the arm to align the power tool and the power tool appliance.

A strut is disposed between the spring and the arm such that the spring exerts force the arm via the strut.

The arm mount extends through the strut.

The strut is disposed around a strut mount, the arm mount extending longitudinally rearward from the strut mount.

The strut mount is radially larger than the arm mount relative to a drive axis of the drive.

The strut is configured to pivot relative to the housing.

The strut is configured to rock on a strut pivot of the housing.

The strut pivot is disposed longitudinally between a center of gravity of the power tool appliance and the arm pivot.

The strut pivot is disposed longitudinally between a pump inlet of a pump and the arm pivot, the pump supported by the housing and connected to the drive to be powered by the drive.

The arm includes an arm yoke connected to the arm pivot.

The arm yoke includes a first branch disposed on a first lateral side of the housing and a second branch disposed on a second lateral side of the housing.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft is unitary with the drive shaft.

The power tool appliance of the preceding paragraph can optionally include, additionally and/or alternatively, any one or more of the following features, configurations and/or additional components:

The rotational input shaft includes a keyed exterior.

The keyed exterior is hexed.

The rotational input shaft includes a shaft groove.

The keyed exterior extends along the rotational input shaft in a first axial direction relative to the shaft groove and in a second axial direction relative to the shaft groove.

The rotational input shaft includes a head and a shaft body, the shaft groove disposed axially between the head and the shaft body.

The keyed exterior is formed on the shaft body and the head.

The drive includes: a drive body that is radially enlarged relative to the rotational input shaft, the drive body monolithic with the rotational input shaft; an inner groove formed on the drive body, the inner groove extending about and canted relative to the drive axis; an outer ring disposed about the drive body, the outer ring including an output configured to cause pumping by the pump; an outer groove formed on the outer ring; a plurality of balls disposed in the inner groove and the outer groove; wherein rotation of the drive body causes the outer ring to rock to linearly reciprocate the output.

The drive is rotatably supported by a first bushing and a second bushing, the drive body disposed axially between the first bushing and the second bushing.

The rotational input shaft is cantilevered from the second bushing.

The rotational input shaft and the drive body are formed from a single piece of metal.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft includes a keyed exterior.

The power tool appliance of the preceding paragraph can optionally include, additionally and/or alternatively, any one or more of the following features, configurations and/or additional components:

The keyed exterior is hexed.

The input shaft is part of a single piece of metal that also converts, at least in part, rotational motion to reciprocating motion.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft and a portion of the drive configured to exert axial force to cause axial movement of an output of the drive are formed from a single piece of metal.

The power tool appliance of the preceding paragraph can optionally include, additionally and/or alternatively, any one or more of the following features, configurations and/or additional components:

The rotational input shaft includes a keyed exterior.

The keyed exterior is hexed.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive including a drive shaft configured to rotate on a drive axis; a rotational input shaft projecting rearward relative to a rear side of the housing, the rotational input shaft configured to dynamically connect the drive to the power tool to provide the rotational input from the power tool to the drive, wherein the rotational input shaft is anchored in the housing and is connectable to the power tool to receive the rotational input, wherein the rotational input shaft is not part of the power tool.

The power tool appliance of the preceding paragraph can optionally include, additionally and/or alternatively, any one or more of the following features, configurations and/or additional components:

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes a pump inlet that is exposed through the housing, wherein the pump inlet is configured to receive spray fluid into the pump; and a spray outlet disposed downstream of the pump, the spray outlet configured to atomize the spray fluid output by the pump into a fluid spray; wherein the power tool appliance is reconfigurable between a suction feed state in which the pump is configured to draw the spray fluid upward into the pump and a gravity feed state in which the spray fluid is configured to flow downward into the pump.

The power tool appliance of the preceding paragraph can optionally include, additionally and/or alternatively, any one or more of the following features, configurations and/or additional components:

The pump inlet is oriented vertically downward with the power tool appliance in the suction feed state and the pump inlet is oriented vertically upward with the power tool appliance in the gravity feed state.

The housing is configured to be inverted between the suction feed state in which the pump inlet faces downward and the gravity feed state in which the pump inlet faces upward.

A connector configured to interface with a first reservoir to connect the first reservoir to the pump and configured to interface with a second reservoir to connect the second reservoir to the pump.

The connector is configured to connect to the first reservoir such that the first reservoir hangs down below the housing.

The connector is configured to connect to the second reservoir such that the second reservoir extends above the connector to hold the spray fluid above the pump inlet.

The connector includes a plurality of tabs.

The connector is formed by the pump body.

An arm connected to and extending from the housing, the arm configured to statically connect the power tool and the housing to prevent relative rotation therebetween; wherein the arm is movable relative to the housing such that the housing can be repositioned relative to the arm between the suction feed state and the gravity feed state.

The arm is pivotably connected to the housing.

The arm includes an arm yoke that is pivotably connected to the housing.

The arm yoke extends over lateral sides of the housing to connect to the housing.

A portion of the housing is disposed between a first branch of the arm yoke and a second branch of the arm yoke, the first branch and the second branch pivotably connected to the housing.

The housing is connected to the arm such that an input shaft that extends rearward relative to a rear side of the housing moves through the arm yoke during reconfiguration between the suction feed state and the gravity feed state, wherein the input shaft is configured to be received by the power tool to receive the rotational input.

A front end of the housing does not move through the arm yoke during reconfiguration between the suction feed state and the gravity feed state.

The pump inlet does not move through the arm yoke during reconfiguration between the suction feed state and the gravity feed state.

A mount connected to the arm such that the mount is connected to the housing by the arm, the mount configured to interface with the power tool.

The mount is movable relative to the arm.

The mount is pivotable relative to the arm.

The arm is configured to pivot relative to the housing on a first pivot axis, the mount is configured to pivot relative to the arm on a second pivot axis, and the first pivot axis is parallel to the second pivot axis.

The mount includes a first interface side and a second interface side, the first interface side configured to be oriented face up to contact the power tool with the power tool appliance in the suction feed state, and the second interface side configured to be oriented face up to contact the power tool with the power tool appliance in the gravity feed state.

A slot extends laterally through the mount, the slot configured such that a fixation is capable of being passed through the mount to wrap around a base of the power tool to fix the power tool to the mount.

The mount is formed as a plate.

The arm is disposed directly longitudinally forward of a handle of the power tool with the power tool appliance in both the suction feed state and the gravity feed state such that the arm forms at least a portion of a trigger guard for the power tool.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes a pump inlet that is exposed through the housing, wherein the pump inlet is configured to receive spray fluid into the pump; a spray outlet disposed downstream of the pump, the spray outlet configured to atomize the spray fluid output by the pump into a fluid spray; and an arm connected to the housing and movable relative to the housing, the arm configured to statically connect the power tool to the housing; wherein the housing is configured to pivot relative to the arm between a suction feed state, in which the pump inlet is oriented downward such that the pump is configured to draw the spray fluid upward into the pump, and a gravity feed state, in which the pump inlet is oriented upward such that the spray fluid is configured to flow downward into the pump.

The power tool appliance of the preceding paragraph can optionally include, additionally and/or alternatively, any one or more of the following features, configurations and/or additional components:

The arm is pivotably connected to the housing.

A rotational input shaft supported in the housing is disposed rearward of a rear end of the housing, the spray orifice oriented to emit the fluid spray forward relative to a forward end of the housing.

The rotational input shaft is configured to pass directly between a first branch and a second branch of an arm yoke of the arm that is pivotably connected to the housing as the housing is flipped between the suction feed state and the gravity feed state.

The pump inlet does not pass directly between a first branch and a second branch of an arm yoke of the arm that is pivotably connected to the housing as the housing is flipped between the suction feed state and the gravity feed state.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes a pump inlet that is exposed through the housing, wherein the pump inlet is configured to receive spray fluid into the pump; and a spray outlet disposed downstream of the pump, the spray outlet configured to atomize the spray fluid output by the pump into a fluid spray; wherein the housing is configured to flip between a suction feed state, in which the pump inlet is oriented downward such that the pump is configured to draw the spray fluid upward into the pump, and a gravity feed state, in which the pump inlet is oriented upward such that the spray fluid is configured to flow downward into the pump.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes a pump inlet that is exposed through the housing, wherein the pump inlet is configured to receive spray fluid into the pump; a spray outlet disposed downstream of the pump, the spray outlet configured to atomize the spray fluid output by the pump into a fluid spray; an arm connected to the housing and movable relative to the housing; and a mount connected to the arm and movable relative to the arm; wherein the mount and the arm are configured to statically connect the power tool to the housing; and wherein the housing is configured to pivot relative to the arm between a suction feed state, in which the pump inlet is oriented downward such that the pump is configured to draw the spray fluid upward into the pump, and a gravity feed state, in which the pump inlet is oriented upward such that the spray fluid is configured to flow downward into the pump.

The power tool appliance of the preceding paragraph can optionally include, additionally and/or alternatively, any one or more of the following features, configurations and/or additional components:

The mount includes a first interface side and a second interface side, the first interface side configured to be oriented face up to contact the power tool with the housing disposed in the suction feed state, and the second interface side configured to be oriented face up to contact the power tool with the housing disposed in the gravity feed state.

The mount is configured to pivot relative to the arm to reoriented between the first interface side being oriented face up and the second interface side being oriented face up.

The housing is configured to reoriented relative to the arm such that: a first side of the arm is oriented longitudinally forward relative to the housing with the housing disposed in the suction feed state; and the first side of the arm is oriented longitudinally rearward relative to the housing with the housing disposed in the gravity feed state.

The arm is disposed longitudinally forward of a handle of the power tool with the housing in both the suction feed state and the gravity feed state.

The arm is disposed longitudinally between the pump inlet and a handle of the power tool with the housing in both the suction feed state and the gravity feed state.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a mount connected to the housing, the mount configured to interface with the power tool to statically connect the power tool to the housing; and a fixation configured to wrap around the mount and a base of the power tool to fix the power tool to the mount.

The power tool appliance of the preceding paragraph can optionally include, additionally and/or alternatively, any one or more of the following features, configurations and/or additional components:

The fixation is a strap.

The strap includes hook-and-loop fasteners.

The strap includes double-sided hook and loop fasteners such that a first side of the strap includes both hooks and loops and a second side of the strap includes both hooks and loops.

The fixation includes double-sided hook-and-loop fasteners such that the fixation is configured to remain connected to the mount during flipping of the power tool assembly between a suction feed state and a gravity feed state.

At least one slot extends through the mount, the fixation extending through the at least one slot.

The at least one slot includes a plurality of slots.

The mount includes a rib disposed between a first slot of the plurality of slots and a second slot of the plurality of slots, the rib extending between and connecting a first interface side of the mount and a second interface side of the mount.

The mount comprises: a first interface side configured to be oriented face up to support the power tool with the housing in a suction feed state in which the pump inlet is oriented downward; a second interface side configured to be oriented face up to support the power tool with the housing in a gravity feed state in which the pump inlet is oriented upward; and a slot open laterally through the mount and disposed between the first interface side and the second interface side, the slot configured such that the fixation passes through the slot to fix the power tool to the mount.

The mount further comprises: a laterally elongate rib extending between and connecting the first interface side and the second interface side, the laterally elongate rib at least partially defining the slot and at least partially defining a second slot extending laterally through the mount.

The power tool appliance of the preceding paragraph can optionally include, additionally and/or alternatively, any one or more of the following features, configurations and/or additional components:

The rotational input shaft includes a keyed exterior.

The keyed exterior is hexed.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a drive at least partially disposed within the housing, the drive configured to dynamically connect to the power tool to receive the rotational input from the power tool; a mount connected to the housing, the mount configured to interface with the power tool to statically connect the power tool to the housing; and a fixation configured to extend through a slot that extends laterally through the mount to wrap around the mount and a base of the power tool to fix the power tool to the mount.

The power tool appliance of the preceding paragraph can optionally include, additionally and/or alternatively, any one or more of the following features, configurations and/or additional components:

The fixation is a strap.

The power tool appliance of the preceding paragraph can optionally include, additionally and/or alternatively, any one or more of the following features, configurations and/or additional components:

The rotational input shaft includes a keyed exterior.

The keyed exterior is hexed.

A pump at least partially disposed within the housing, the pump connected to the drive to receive an output from the drive, The pump includes a pump inlet that is exposed through the housing, wherein the pump inlet is configured to receive spray fluid into the pump.

A spray outlet disposed downstream of the pump, the spray outlet configured to atomize output from the pump into a fluid spray.

The pump includes a piston.

The piston is configured to reciprocate along a pump axis, the piston is connected to the drive to receive a reciprocating linear output from the drive, and the drive is configured to rotate on a drive axis.

A power tool appliance configured for use with a power tool that outputs rotational motion, the power tool appliance configured to attach to and receive rotational input from the power tool, the power tool appliance comprising: a housing; a turbine at least partially disposed within the housing; a drive at least partially disposed within the housing, the drive configured to dynamically connect to the power tool to receive the rotational input from the power tool and configured to provide rotational motion to the turbine to drive the turbine; a duct disposed downstream of the turbine, the duct narrowing from the turbine and configured to direct airflow to a spray orifice; and a mount connected to the housing, the mount configured to interface with the power tool to statically connect the power tool to the housing.

The power tool appliance of the preceding paragraph can optionally include, additionally and/or alternatively, any one or more of the following features, configurations and/or additional components:

The drive is configured to receive an input at a first rotational speed and provide an output at a second rotational speed greater than the first rotational speed.

The drive includes an overdrive gear set configured to increase a speed of the rotational input.

A method of assembling a tool system, the method comprising: inserting an input shaft extending out from a housing of a power tool appliance into a bit receiver of a power tool; mounting the power tool to a mount of the power tool appliance to statically connect the power tool relative to the housing; and pulling the trigger of the power tool to cause an output of the power tool appliance.

The method of the preceding paragraph can optionally include, additionally and/or alternatively, any one or more of the following features, configurations and/or additional components:

Inserting the input shaft is performed before mounting the power tool to the mount.

Mounting the power tool to the mount includes wrapping a strap around a base of the power tool.

Mounting the power tool to the mount includes securing a battery of the power tool onto a plate of the power tool appliance.

A power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; a support assembly connected to the housing and extending from the housing, the support assembly configured to interface with the power tool to statically connect the power tool to the housing; and a biaser configured to bias the support assembly to align the power tool and the drive.

The power tool appliance of the preceding paragraph can optionally include, additionally and/or alternatively, any one or more of the following features, configurations and/or additional components:

The biaser is a spring disposed between the housing and the support assembly, the biaser configured to bias the housing relative to the support assembly.

The biaser is a spring configured to set an angle between the support assembly and the housing.

The biaser is a spring configured to set a length of the support assembly.

The spring is disposed within the support assembly.

The spring is configured to bias the support assembly towards a contracted state.

The biaser is a spring is disposed between the housing and a strut, spring configured to bias the housing away from the strut.

The strut is configured to engage the support assembly.

The support assembly comprises an arm, the arm connected to the housing and movable relative to the housing.

The biaser is a spring configured to set an angle of the arm relative to the housing.

The biaser is a spring is configured to set a length of the arm.

The biaser is a spring is configured to bias the housing vertically upward and away from the arm.

The arm is pivotably connected to the housing.

The support assembly includes a mount connected to the housing by the arm, wherein the mount is configured to interface with the power tool to statically connect the power tool to the power tool appliance.

The support assembly comprises an arm, wherein the arm is adjustable to change a length of the arm, and wherein the biaser is configured to bias the arm into a contracted state.

The arm includes an upper arm extension connected to and extending from the housing, and a lower arm extension extending from the upper arm extension, wherein the upper arm extension and the lower arm extension are telescopically disposed.

The biaser is a first spring disposed between the housing and the support assembly; a second spring is disposed between the housing and the support assembly; and the first spring and the second spring are configured to bias the housing upwards and away from the support assembly to align the power tool and the power tool assembly.

The first spring is configured to bias the housing in a first vertical direction and the second spring is configured to bias the housing in a second vertical direction opposite the first vertical direction.

A power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; a support assembly including an arm connected to the housing and extending from the housing, the support assembly configured to interface with the power tool to statically connect the power tool to the housing; and a spring disposed between the arm and the housing, the spring configured to bias the housing upward and away from the support assembly to align the power tool and the drive.

A power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool; a pump at least partially disposed within the housing, the pump connected to the drive to receive an output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; a support assembly including an arm connected to the housing and extending from the housing, the support assembly configured to interface with the power tool to statically connect the power tool to the housing; and a spring disposed within the arm, the spring configured to adjust a length of the arm and configured to bias the arm towards a contracted state to align the power tool and the drive.

A power tool appliance configured for use with a power tool that outputs rotational motion, the power tool appliance configured to attach to and receive rotational input from the power tool, the power tool appliance including a housing; a drive at least partially disposed within the housing, the drive configured to dynamically connect to the power tool to receive the rotational input from the power tool, the drive configured to rotate on a drive axis; a pump at least partially disposed within the housing, the pump connected to the drive to receive an output from the drive, wherein the pump includes an inlet that is exposed through the housing, wherein the inlet is configured to receive spray fluid into the pump; a spray outlet disposed downstream of the pump, the spray outlet configured to atomize the spray fluid output by the pump into a fluid spray; and a support assembly connected to the housing and extending from the housing, the support assembly configured to interface with the power tool to statically connect the power tool to the housing; wherein a piston of the pump is vertically aligned with the drive and radially offset from the drive axis.

The power tool appliance of the preceding paragraph can optionally include, additionally and/or alternatively, any one or more of the following features, configurations and/or additional components:

The piston is configured to reciprocate on a pump axis, and wherein the pump axis is disposed parallel to the drive axis.

The piston is configured to reciprocate on a pump axis, wherein the pump axis and the drive axis are co-planar on a plane that extends longitudinally and vertically.

A power tool appliance for use with a power tool that outputs rotational motion for one or both of drilling and fastening, the power tool appliance configured to attached to, and receive rotational input from, the power tool, the power tool appliance including a housing; a drive at least partially located within the housing, the drive comprising an input shaft having an end that is configured to be received by the power tool, the input shaft extending into the housing, the drive converting rotational motion received from the power tool through the input shaft into a reciprocating motion; and a support connected to the housing, the support configured to interface with the power tool to statically connect the power tool to the housing, the support comprising an arm that extends away from the housing and that connects between the power tool and the housing.

The power tool appliance of the preceding paragraph can optionally include, additionally and/or alternatively, any one or more of the following features, configurations and/or additional components:

The support comprises a strap that wraps at least partially around a battery portion of the power tool to brace the power tool relative to the housing.

The strap includes hook and loop fasteners.

The support comprises a plate on which the battery portion of the power tool stands, and wherein the strap extends through or around the plate such that the strap holds the battery portion of the power tool against the plate.

The arm pivots relative to the housing.

The end of the input shaft is multi-faceted.

Material that forms the input shaft is contiguous with material that forms at least part of an eccentric of the drive.

The arm is biased by at least one spring to urge the power tool relative to the housing.

The at least one spring urges the arm to shorten which, due to the power tool being connected to the housing via the arm of the support, urges the power tool relative to the housing.

One or more spring of the at least one spring is located inside of the arm, the arm comprises telescoping parts to shorten and lengthen the arm, and the one or more spring of the at least one spring urges the arm to shorten or lengthen.

One or more spring of the at least one spring is located outside of the arm and urges a strut of the power tool appliance.

The strut engages the arm which, due to the power tool being connected to the housing via the arm of the mount, urges the power tool relative to the housing.

The one or more spring of the at least one spring is located between the housing and the strut such that the one or more spring pushes the strut away from the housing.

The at least one spring urges the power tool to pre-load the power tool to minimize entry into a mode of the power tool.

The at least one spring urges the power tool to align relative to the housing of the power tool appliance.

The support comprises a plate on which the battery portion of the power tool stands.

The plate is connected to the arm by a hinge which permits the plate to pivot relative to the arm.

A pump that receives the reciprocating motion from the drive which operates the pump.

A spray nozzle that sprays fluid output by the pump and a reservoir supported by the housing, the pump in fluid communication with the reservoir.

A method of using a power tool appliance to convert rotational motion output from a power tool to reciprocating motion, the method including mounting the power tool to the power tool appliance, the power tool appliance comprising: a housing; a drive at least partially located within the housing, the drive comprising an input shat, the input shaft extending out from the housing; and a support connected to the housing, the support configured to interface with the power tool to statically connect the power tool to the housing, the support comprising an arm that extends away from the housing and which connects between the power tool and the housing, wherein mounting comprises the input shaft being received within the power tool; and operating the power tool appliance via the power tool by the drive converting rotational motion received from the power tool through the input shaft into a reciprocating motion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power tool appliance for use with a power tool that outputs rotational motion for one or both of drilling and fastening, the power tool appliance configured to attached to, and receive rotational input from, the power tool, the power tool appliance comprising:

a housing;

a drive at least partially located within the housing, the drive comprising an input shaft having an end that is configured to be received by the power tool, the drive converting rotational motion received from the power tool through the input shaft into a reciprocating motion; and a support connected to the housing, the support configured to interface with the power tool to statically connect the power tool to the housing, the support comprising an arm that extends away from the housing and that connects between the power tool and the housing;

wherein the support comprises a plate on which a battery portion of the power tool stands and a strap that extends around at least part of the plate, wherein the strap wraps at least partially around the battery portion of the power tool to brace the power tool relative to the housing and hold the battery portion of the power tool against the plate.

2. The power tool appliance of claim 1, wherein the strap includes hook and loop fasteners.

3. The power tool appliance of claim 2, wherein the arm pivots relative to the housing.

4. The power tool appliance of claim 1, wherein the end of the input shaft is multi-faceted.

5. The power tool appliance of claim 1, wherein material that forms the input shaft is contiguous with material that forms at least part of an eccentric of the drive.

6. A power tool appliance for use with a power tool that outputs rotational motion for one or both of drilling and fastening, the power tool appliance configured to attached to, and receive rotational input from, the power tool, the power tool appliance comprising:

a housing;

a drive at least partially located within the housing, the drive comprising an input shaft having an end that is configured to be received by the power tool, the drive converting rotational motion received from the power tool through the input shaft into a reciprocating motion; and a support connected to the housing, the support configured to interface with the power tool to statically connect the power tool to the housing, the support comprising an arm that extends away from the housing and that connects between the power tool and the housing;

wherein the arm is biased by at least one spring to urge the power tool relative to the housing.

7. The power tool appliance of claim 6, wherein the at least one spring urges the arm to shorten which, due to the power tool being connected to the housing via the arm of the support, urges the power tool relative to the housing.

8. The power tool appliance of claim 7, wherein one or more spring of the at least one spring is located inside of the arm, the arm comprises telescoping parts to shorten and lengthen the arm, and the one or more spring of the at least one spring urges the arm to shorten or lengthen.

9. The power tool appliance of claim 6, wherein one or more spring of the at least one spring is located outside of the arm and urges a strut of the power tool appliance.

10. The power tool appliance of claim 9, wherein the strut engages the arm which, due to the power tool being connected to the housing via the arm of the support, urges the power tool relative to the housing.

11. The power tool appliance of claim 9, wherein the one or more spring of the at least one spring is located between the housing and the strut such that the one or more spring pushes the strut away from the housing.

12. The power tool appliance of claim 6, wherein the at least one spring urges the power tool to pre-load the power tool to minimize entry into a mode of the power tool.

13. The power tool appliance of claim 6, wherein the at least one spring urges the power tool to align relative to the housing of the power tool appliance.

14. A power tool appliance for use with a power tool that outputs rotational motion for one or both of drilling and fastening, the power tool appliance configured to attached to, and receive rotational input from, the power tool, the power tool appliance comprising:

a housing;

a drive at least partially located within the housing, the drive comprising an input shaft having an end that is configured to be received by the power tool, the drive converting rotational motion received from the power tool through the input shaft into a reciprocating motion; and a support connected to the housing, the support configured to interface with the power tool to statically connect the power tool to the housing, the support comprising an arm that extends away from the housing and that connects between the power tool and the housing;

wherein the support comprises a plate on which the battery portion of the power tool stands, and wherein the plate is connected to the arm by a hinge which permits the plate to pivot relative to the arm.

15. The power tool appliance of claim 14, further comprising a pump that receives the reciprocating motion from the drive which operates the pump.

16. The power tool appliance of claim 15, further comprising a spray nozzle that sprays fluid output by the pump and a reservoir supported by the housing, the pump in fluid communication with the reservoir.

* * * * *